US010325392B2

(12) United States Patent
Uzgin et al.

(10) Patent No.: US 10,325,392 B2
(45) Date of Patent: Jun. 18, 2019

(54) CONTENT REPLACEMENT SYSTEM USING VISUAL DESIGN OBJECT MODELS

(71) Applicant: Cimpress Schweiz GmbH, Winterthur (CH)

(72) Inventors: Alex Uzgin, Lexington, MA (US); Donald J. Naylor, Marblehead, MA (US); Jarongorn Manny Lertpatthanakul, Windham, NH (US); Jeremy Pallai, Milton, MA (US); Jonathan Gaudette, Shrewsbury, MA (US); Rebecca Safran, Cambridge, MA (US); Ramon Harrington, Hanover, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 56 days.

(21) Appl. No.: 15/665,890

(22) Filed: Aug. 1, 2017

(65) Prior Publication Data

US 2019/0043231 A1    Feb. 7, 2019

(51) Int. Cl.
| | |
|---|---|
| G06T 11/00 | (2006.01) |
| G06T 11/60 | (2006.01) |
| G06T 7/90 | (2017.01) |
| G06F 3/0484 | (2013.01) |
| G06F 16/54 | (2019.01) |
| G06F 3/0482 | (2013.01) |

(52) U.S. Cl.
CPC ......... *G06T 11/60* (2013.01); *G06F 3/04845* (2013.01); *G06F 16/54* (2019.01); *G06T 7/90* (2017.01); *G06T 11/001* (2013.01); *G06F 3/0482* (2013.01); *G06T 2200/16* (2013.01); *G06T 2200/24* (2013.01); *G06T 2200/28* (2013.01)

(58) Field of Classification Search
CPC ............................... G06T 11/60; G06T 11/001
See application file for complete search history.

(56) References Cited

U.S. PATENT DOCUMENTS

| | | | | |
|---|---|---|---|---|
| 6,344,853 B1 * | 2/2002 | Knight | ................. | G06Q 10/087 345/629 |
| 2001/0050690 A1 * | 12/2001 | Giles | ..................... | G06Q 30/06 345/636 |
| 2005/0268229 A1 * | 12/2005 | Wessling | .............. | G06F 17/212 715/275 |
| 2007/0103490 A1 * | 5/2007 | Foster | ..................... | G06T 11/60 345/634 |
| 2015/0339731 A1 * | 11/2015 | Bloem | ............... | G06Q 30/0276 705/14.72 |
| 2015/0339754 A1 * | 11/2015 | Bloem | ............. | G06F 17/30867 705/26.7 |
| 2017/0017634 A1 * | 1/2017 | Levine | .................. | G06F 17/248 |
| 2018/0033064 A1 * | 2/2018 | Varley | ................ | G06Q 30/0621 |

* cited by examiner

*Primary Examiner* — Ryan McCulley
(74) *Attorney, Agent, or Firm* — Marshall, Gerstein & Borun LLP

(57) ABSTRACT

A content replacement system and method for simultaneously updating a plurality of images of visual designs on an electronic display of an electronic device using synchronized client- and server-side visual design object models by representing visual objects in visual designs using a keyed attribute and associated attribute value comprising a visual object specification.

7 Claims, 14 Drawing Sheets

CONTENT REPLACEMENT SYSTEM USING VISUAL DESIGN OBJECT MODELS

BACKGROUND OF THE INVENTION

One of the advancements in computerization of graphic design has been the introduction of electronic design templates. Electronic design templates are pre-defined visual designs in electronic format that may serve as the starting point for creating a personalized or customized visual design. Electronic design templates typically include pre-populated content, such as sample text, images, layout and color scheme, that may be edited by a user of a computerized electronic visual design tool to create a customized design. Electronic design templates greatly ease the barriers to creation of visual designs by graphic professionals and laypersons alike. A typical electronic visual design tool will allow a user to view available templates, select one for editing, and then edit the template by entering text information, moving, removing, adding, and/or changing existing design elements in the template, changing colors, fonts, backgrounds, images, text, etc.

In a visual design creation environment, the number of available visual design templates available for use with an electronic visual design tool may be quite large. A given electronic visual design tool may provide hundreds or even thousands of available visual design templates. The limited screen size of an electronic device prevents simultaneous display of all available templates. A user of such tool may thus find it challenging to parse through and find template(s) that they might choose. To assist in overcoming this challenge, many electronic visual design tools provide a template search and selection tool which displays available templates in a gallery view on the screen of the user's electronic display. The template search and selection tool may include filtering tools to allow the user to filter the template search results to view only those templates that meet the filter criteria. To further assist in template selection, the electronic visual design tool may display the available templates in a gallery view containing multiple simultaneously displayed small-scale images of available templates from which to choose. Such images are typically low-resolution non-editable raster images (sometimes called "thumbnail" images) of generic, non-personalized and unedited templates and take up only a small area of the available screen area. The gallery view of images of available templates allows for side-by-side comparison of different template images to facilitate more efficient template selection. However, despite having search, filter and gallery view tools, a user of an electronic visual design tool may still encounter difficulty in choosing a template if they cannot envision how such templates will look if edited to include their own personalized style and content modifications.

SUMMARY OF THE INVENTION

A novel content replacement system and method for simultaneously updating a plurality of images of visual designs on an electronic display of an electronic device using synchronized client- and server-side visual design object models by representing visual objects in visual designs using a keyed attribute and associated attribute value comprising a visual object specification is described hereinafter.

In an embodiment, a system for simultaneously updating a plurality of images of visual designs on an electronic display of an electronic device includes a first computerized device having an electronic display. The first computerized device executes a first computer program which communicates with a second computer program to receive, and simultaneously display on the electronic display, a first plurality of images of first visual designs. The first computer program generates a graphical user interface that includes content and controls displayed on the electronic display. The graphical user interface provides a visual object selection tool which displays images of visual objects available for selection, and provides control(s) to allow user selection of one of the available visual objects. Via user input hardware such as a keyboard, a mouse, a touchpad, voice recognition hardware, etc., a user can enter user selection input which corresponds to selection of one of the displayed visual objects. The computerized device receives the user input and the GUI responds to the user input by selecting an identifier corresponding to the selected visual objects. The first computer program sends the identifier to a second computer program, which may reside and execute on the same device, or may be accessed and execute at a remote computerized device. Computer-readable memory stores a plurality of models of different visual designs, each visual design model comprising at least one key attribute identifier and a corresponding attribute value comprising a visual object representation of a visual object. The second computer program responds to receipt of the selected visual object identifier by obtaining a visual object representation of the visual object associated with the identifier, and replaces, in each of the models of different visual designs, attribute value of the key attribute identifier with the obtained visual object representation of the visual object associated with the identifier. The second computer program then renders a second plurality of images corresponding to the updated visual design models and sends the second plurality of images to the first computer program, which simultaneously displays the second plurality of images in place of said first plurality of images.

In another embodiment, a computerized method for updating a plurality of visual design specifications includes storing in computer memory a plurality of visual design specifications, each visual design specification having a respective vector graphic specification of an associated respective visual object, the respective visual object vector graphic specification in each of said plurality of visual design specification identifiable by way of a key attribute identifier, the key attribute identifier having in said respective visual design specification a corresponding attribute value comprising the respective vector graphic specification of the respective visual object, each visual design specification specified in a format that can be rendered by a rendering application to generate a corresponding device-ready visual design specification. The method further includes steps, executed by a processor, of receiving an identifier of a replacement visual object, the replacement visual object having an associated vector graphic specification, identifying the vector graphic specification associated with the identified replacement visual object, retrieving the vector graphic specification associated with the identified replacement visual object, identifying the key attribute identifier in each of the visual design specifications and replacing its corresponding attribute value with the vector graphic specification associated with the replacement visual object, to generate, and store in computer memory, corresponding updated versions of said plurality of visual design specifications.

DETAILED DESCRIPTION OF THE PREFERRED EMBODIMENTS

In the context of the present invention, the following terms are defined as follows:

Content—text, image, graphical, or other visual element or composite set of visual elements.

Visual design—A visual design is a visual arrangement and presentation of content which, when displayed on a physical medium, is viewable by a human.

Visual design specification—a set of instructions that are readable and/or interpretable by a rendering application which specify content and how the content is presented.

Rendering application—a software and/or hardware tool which reads and/or interprets the instructions of a visual design specification to produce a device-ready specification that can be processed by an output device to present a visual design on an output medium.

Figure 1:
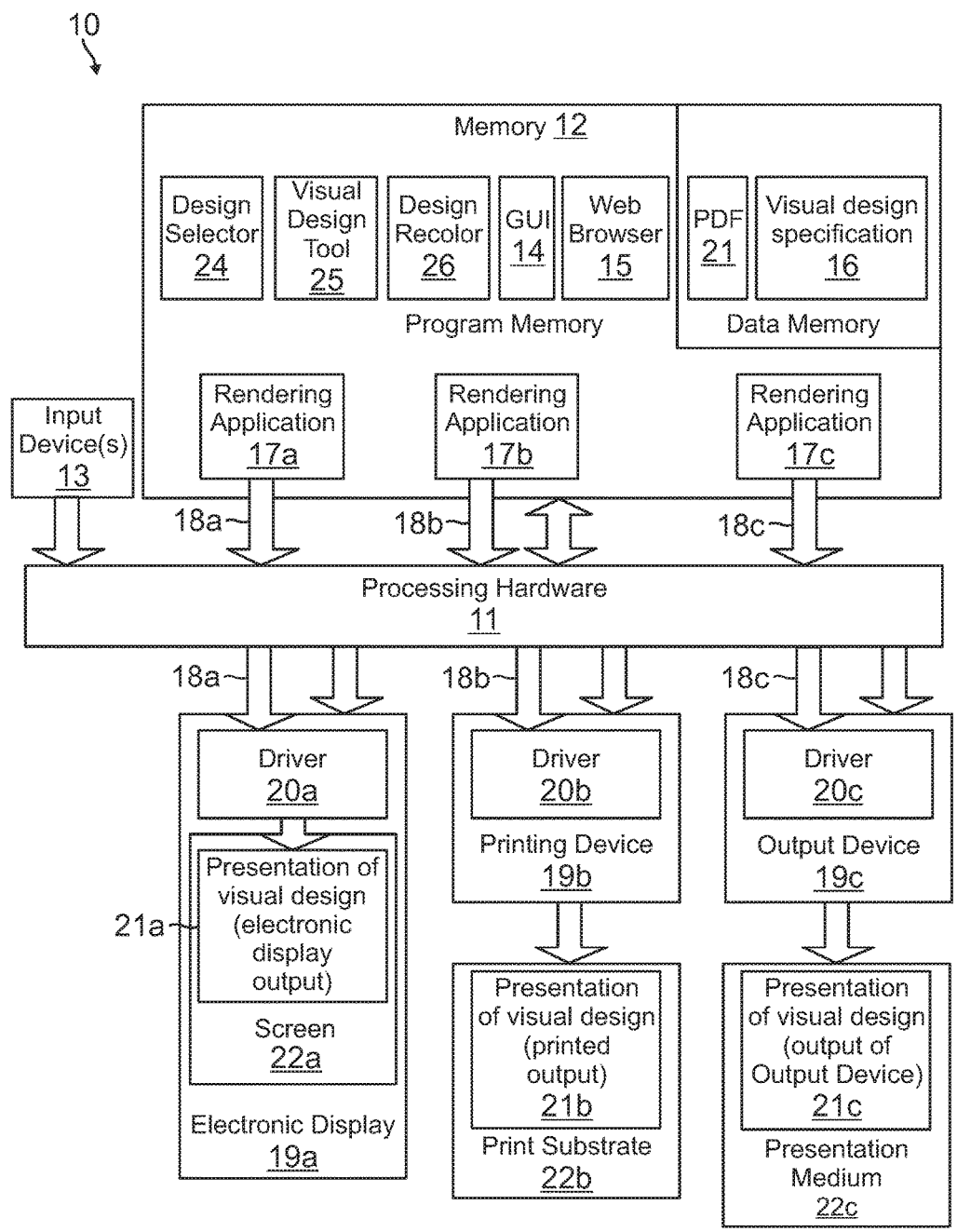
FIG. 1 is a schematic block diagram of a computer environment implementing embodiment(s) of the invention.

FIG. 1 is a block diagram illustrating a system 10 in which the invention may operate. The system 10 is a computerized environment that includes processing hardware 11, computer-readable memory 12, an electronic display 19a, and one or more user input devices 13. The processing hardware 11 can be any physical hardware processing device or combination of devices, including, by way of example and not limitation, one or more computer processing units (CPUs), microprocessors, programmable ASICs, etc.

The computer-readable memory 12 is tangible hardware that stores data and program instructions that can be read, and where appropriate, written, by the processing hardware 11. Memory 11 may include one or more different types of memory, and each different type of memory may be one or both, or a combination, of local memory (as shown) and remote memory (not shown). Local memory may include locally-addressed read-only memory (ROM) or random access memory (RAM), and/or may be accessible in a local disk drive or attached memory. Remote memory may be network accessible storage, such as NAS drive, a data server and/or cloud-based storage, which is accessible by the processing hardware 11 via a network. FIG. 1 illustrates memory 12 as a single block, but it is to be understood that memory 12 may be distributed across many different types of memory, and, relative to the processing hardware 11, may be local and/or remote memory, and further may be accessed directly or indirectly (via a network) by the processing hardware 11.

Figure 2:
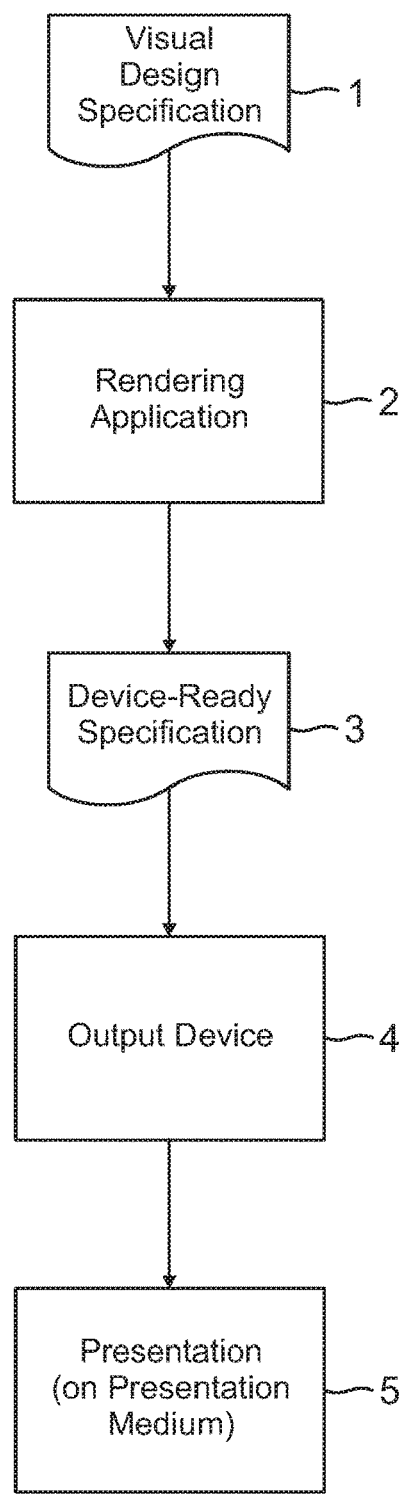
FIG. 2 is a flow diagram illustrating an exemplary process for representing and producing visual designs within a computerized environment.

To create, store, process, present, and/or otherwise work with a visual design within a computerized environment, the visual design must be represented in a way that is understood by the computerized environment. FIG. 2 illustrates the general process for representing and producing visual designs within a computerized environment. As shown, the process generally involves two components: (1) a visual design specification 1 which represents the visual design in a language understood within the computerized system; and (2) a rendering application 2 executing in the computerized environment which understands how to process the visual design specification 1 and turn it into a device-ready specification 3 which can be sent to an output device 4 to instruct the output device 4 in presenting the visual design described in the device-ready specification 3 on a presentation medium 5 that is viewable by a human user. In an embodiment, a printing device (such as a printer or printing press) is an output device 4, where paper or some other substrate is its corresponding output medium 5. In another embodiment, an electronic display of an electronic device is an output device 4, and the display screen of the electronic display is the corresponding output medium 5.

In an embodiment, memory 12 stores computer-readable program instructions that implement one or more electronic visual design tool(s) 25. An electronic visual design tool 25 may incorporate a visual design selector tool 24 which may present a plurality of visual design templates that a user of the electronic visual design tool 25 may select and edit. The electronic visual design tool 25 may also include a graphical user interface (GUI) 14 application which displays graphical controls and elements on a screen 22a of an electronic display 19a, that allows a user interacting with the GUI 14 via the display 19a and one or more input device(s) 13 (such as, by way of example and not limitation, a mouse, a keyboard, a touchpad, etc.) to create a new visual design, and/or select and edit a previously saved visual design or a visual design template, and display a presentation 21a of the visual design on a screen 22a of the electronic device 19a. A visual design created and/or edited using the electronic visual design tool 25 is stored and represented in memory 11 as a visual design specification 16. The electronic visual design tool 25, visual design selector tool 24, and GUI 14 may execute as a stand-alone application(s), or may run in a Web browser 15 for use in web-enabled design tools.

In an embodiment, memory 11 stores a visual design specification 16. As noted previously, a visual design specification 16 is a set of computer-readable instructions which specify content and presentation information for rendering a visual design. A visual design specification 16 may be read and written by the electronic visual design tool(s) 25. A visual design specification 16 is also designed to be read by, interpreted by, and/or consumed by, a rendering application 17a, 17b, 17c to generate a corresponding device-ready specification 18a, 18b, 18c.

Memory 11 may include one or more rendering applications 17a, 17b, 17c, each of which reads, interprets and/or otherwise consumes instructions of a visual design specification 16 to generate a respective device-ready specification 18a, 18b, 18c which is used by a respective output device 19a, 19b, 19c to produce a presentation of a visual design 21a, 21b, 21c on an output medium 22a, 22b, 22c. Rendering applications 17a, 17b, 17c may include one or several different types of rendering applications, each configured to generate a device-ready specification 18a, 18b, 18c of a visual design for a particular type of output device 19a, 19b, 19c.

In general, a rendering application 17a, 17b, 17c takes as input a visual design specification 16 and produces a device-ready specification 18a, 18b, 18c that can be processed by an output device 19a, 19b, 19c to present a presentation of the visual design 21a, 21b, 21c on a presentation medium 22a, 22b, 22c.

One type of rendering application is an electronic display renderer 17a which generates device-ready specification 18a that can be processed by a display driver 20a of an electronic display 19a to display a presentation of a visual design 21a on a screen 22a of the electronic display 19a. The electronic display 19a includes a display driver 20a which drives the color and brightness/illumination of each of the pixels of the display screen 22a. In an embodiment, the rendering application 17a is a visual design application that allows a user to view and create visual designs via the graphical user interface (GUI) 14. A user may interact with the GUI 14 to create a visual design, which is represented as a visual design specification 16. In an embodiment, the GUI 14 may run in a Web browser 15. The portion of the GUI 16 that runs in the web browser 15 comprises browser-interpretable instructions such as HTML, JavaScript and/or extensions/versions thereof, and/or other browser-interpretable instructions. The portion of the GUI 14 that runs in the web browser 15 instructs the browser to render graphical elements on the display screen 22a, and provides instructions on how to interpret and act on user input from the input device(s) 13.

The browser-interpretable instructions may also include some portion of instructions which are associated with one or more visual design specification(s) 16 and which instruct the browser on how to produce presentation(s) of the respective visual design(s) on the screen 22a of the electronic device 19a. In an embodiment, the browser 15 is the rendering application 17a for the electronic display 19a, and produces a device-ready specification 18a that is recognizable by the display driver 20a of the electronic display 19a to produce, and output onto the screen 22a of the electronic display 19a, a presentation 21a of the visual design—that is, the Red, Green, and Blue (RGB) values of the individual pixels of the screen 22a of the electronic display 19a are set to produce the visual design on the screen.

In an embodiment, the rendering application 17a is Web browser 15, which receives a visual design specification (which may be inline in an HTML web page, or alternatively may referenced by a reference link (for example, a universal resource locator (URL) or a physical or virtual memory address, etc.) to the the visual design specification 16), retrieves and/or accesses the visual design specification 16, interprets the retrieved visual design specification 16, retrieves any remote content (such as images and/or text that are referenced in the visual design specification 16), and displays (i.e., sets the RGB values of the pixels of the electronic display screen) the content specified in the visual design specification 16 in accordance with the presentation instructions provided in the visual design specification 16 in a browser window on the screen 22a of the electronic display 19a. Examples of Web browser rendering applications include the renderers implemented within Google Chrome, Microsoft Internet Explorer, Mozilla Firefox, and many others.

Another type of rendering application is a print renderer 17b, which processes a visual design specification 16 and produces a print-ready file 18b implemented in a print-ready document format which may be sent to a printing device (such as, but not limited to, a printer or a printing press) to print a presentation 21b the visual design onto a print substrate 22b. In an embodiment, the print renderer 17b is a prepress rendering application that produces a print-ready document in a Portable Document Format (PDF) or a postscript (PS) format. The print-ready document 18b is recognizable and processable by a driver 20b of a printing device 19b to produce a printed presentation 21b of the visual design on a physical substrate 22b (for example, the visual design printed onto paper).

Yet another rendering application 17c may process a visual design specification 16 to produce a device-ready specification 18c that is recognized and processable by, via a driver 20c of, yet a third type of output device 19c to produce a presentation 21c of the visual design on a third type of presentation medium 22c.

In order for the rendering application(s) 17a, 17b, 17c to process the visual design specification 16, the visual design specification 16 must be specified in a format recognized by the rendering application(s) 17a, 17b, 17c. In the context of the present invention, a visual design includes individual elements or groups of elements, such as text, images, graphics, etc., that are individually specified within the visual design specification. In an embodiment, the visual design specification is represented in a markup language or in a combination of several markup languages, that is recognizable by those rendering application(s) that are intended to process the visual design specification. The markup languages could be one or more of HyperText Markup Language (HTML) and/or any of its variants (such as but not limited to HTML5, XHTML, DHTML, etc.) and any extensions, libraries, and/or plug-ins, including Cascading Style Sheets (CSS); JavaScript or any of its variants, extensions, libraries, and/or plug-ins, including Java Script Object Notation (JSON), eXtensible Markup Language (XML), Markdown, Scalable Vector Graphics (SVG), or any other programming language that includes semantics for retrieving the design elements and instructions specifying how to present the retrieved design elements on an output medium.

The visual design specification 16 includes specification of content elements (inline and/or references/addresses/URLs specifying where to retrieve corresponding content elements) and presentation instructions such as layout and style information, which are used by a rendering application 17a, 17b, 17c to build the device-ready specification 18a, 18b, 18c that a particular output device 19a, 19b, 19c can process to produce the presentation 21a, 21b, 21c of the visual design on a presentation medium 21a, 21b, 21c. The layout defines the placement and size of the individual elements in the overall design. A layout may define one or more content containers which define an area in which specified content (such as text, images, graphics, etc.) is placed when rendered by a rendering application 17a, 17b, 17c. The layout specification for a container typically includes placement information, such as absolute or relative positioning information, and may further include sizing information to constrain the size of the container within the device-ready specification so as not to go below a minimum, and/or not go above a maximum, width and/or height.

A visual design specification 16 specifies one or more content elements. Content elements include text elements, image or graphical elements, and/or audiovisual elements. A text element is text, character and/or other symbol content that is inserted into and contained within a text container. An image element is a pictorial object that is inserted into and contained within an image container. An image element is typically a photograph, a graphic, or other image, represented in a format (such as a .jpg, .png, .pdf, .tiff, .svg, etc.) recognizable by a rendering application.

The visual design specification 16 includes style information which instructs a rendering application 17a, 17b, 17c how to present the various content elements. Style information includes style components. Style components include color fills, color patterns, color schemes, transparency/opacity effects, other filtering effects, font colors, font size, font style, line style, line color, line design, line end style, stroke width, shadow effects, margins, tabs and justification, etc. Style components can be specified at the element level, group (of elements) level, or page/document level. When a rendering application is a web browser, style components are often defined using cascading style sheets (CSS). Cascading style sheets allow the content of an electronic document to be separated from its presentation, and can be useful also when working with visual design specifications.

Figure 3:
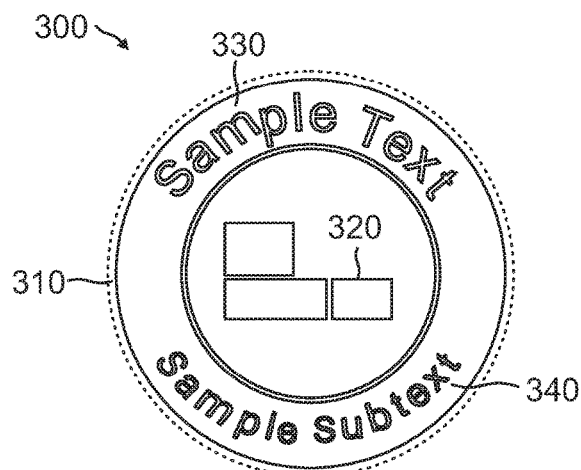
FIG. 3 is a presentation of a visual design.

With the above in mind, it is useful to examine an example visual design and how it may be represented as a visual design specification that can be processed in a computer environment. FIG. 3 illustrates an example visual design 300. The example visual design 300 comprises a set of content objects, including first, second, third and fourth content objects, respectively labeled 310, 320, 330, and 340, and which, for illustration purposes, are extracted separately in respective FIGS. 3A, 3B, 3C and 3D. As referred to herein, a "content object" is a group of individual content elements that is treated as a group by the rendering application.

Figure 3A:
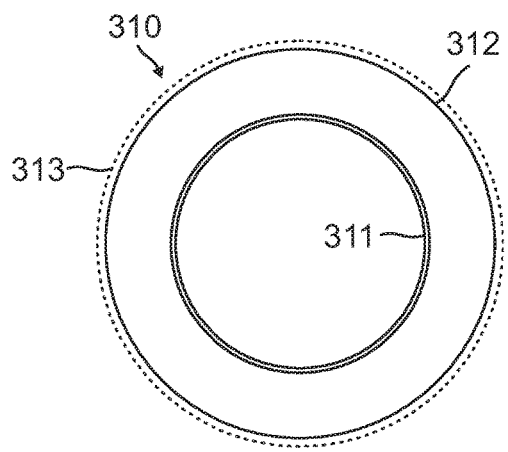
FIG. 3A is a presentation of a first content object from the visual design shown in FIG. 3.

The first content object 310, shown in FIGS. 3 and 3A, may be represented as a grouped set of individual content elements, including a first graphical element 311 in the form of circle object appearing as a continuous line characterized by a relatively small (i.e., thin) stroke width, a second graphical element 312 in the form of a second circle object appearing as a continuous line characterized by a relatively large (i.e., wide) stroke width, and a third graphical element 313 in the form of circle object appearing as a dotted line characterized by a relatively small (i.e., thin) stroke width. Each element 311, 312, 313 is characterized by a respective fill color and pattern (in this example, the pattern is a solid color, but in other embodiments, a pattern (i.e., a repetitive sequence of graphical components such as lines and/or other graphical elements defined by visually distinguishable colors and/or brightness/illumination/intensity) or even an image (such as a photograph) could serve as the fill for the element. Thus, element 311 is characterized by fill color 311C, element 312 is characterized by fill color 312C, and element 313 is characterized by fill color 313C. Fill colors 311C, 312C and 313C may the same or may be different from one another, in any combination. For example, fill colors 311C, 312C and 313C could be identical. Alternatively, fill colors 311C, 312C and 313C could each be different from one another. In yet another example, fill color 311C and 313C may be the same, while fill color 312C is different, or fill color 311C and 312C could be the same while fill color 313C is different, and so on. Additionally, fill colors 311C, 312C, 313C could also vary in brightness or illumination level.

Figure 3D:
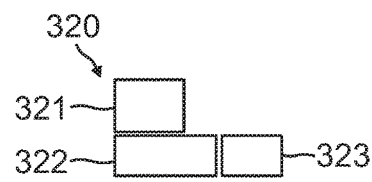
FIG. 3D is a presentation of a fourth content object from the visual design shown in FIG. 3.
Figure 3B:
FIG. 3B is a presentation of a second content object from the visual design shown in FIG. 3.

The second content object 320 in the example visual design 300 of FIG. 3 is shown in FIG. 3B, and includes a grouped set of individual content elements, including a first graphical element 321 in the form of a rectangle object characterized by a first fill color 321C, a second graphical element 322 in the form of a rectangle object characterized by a second fill color 322C, and a third graphical element 323 in the form of a rectangle object characterized by a third fill color 323C. The fill colors 321C, 322C and 323C may be the same or different, in any combination of color(s) and/or brightness/illumination/intensity level.

Figure 3C:
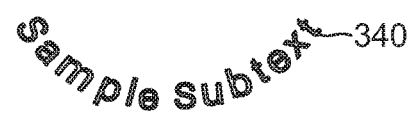
FIG. 3C is a presentation of a third content object from the visual design shown in FIG. 3.

The third content object 330 in the example visual design 300 of FIG. 3 is shown in FIG. 3C, and includes a grouped set of individual text elements, including a first text element (the text character "S"), a second text element (the text character "a"), a third text element (text character "m"), and so on (to form the example text "Sample Text" where each character is defined by a font, a font size, a font color, etc., and is spaced and rotated relative to the other characters to form a curved text group. In this embodiment, each character in the example text corresponds to an individual text element due to the curved text design (achieved through spacing and rotation instructions). In other embodiments, such as a design in which text is laid out horizontally, a given text element may include multiple characters within a single text element.

The fourth content object 340 in the example visual design 300 of FIG. 3 is shown in FIG. 3D, and includes another grouped set of individual text elements, including a first text element (the text character "S"), a second text element (the text character "a"), a third text element (text character "m"), and so on (to form the example text "Sample Subtext", again where each character is spaced and rotated to form a curved text group. In this embodiment, each character in the example text corresponds to an individual text element in order to place each text element on a curve.

As noted above, in other embodiments, a given text element may include multiple characters within a single text element.

In an embodiment, a visual design specification corresponding to the design shown in FIG. 3 may be represented in a vector format, such as Scalable Vector Graphic (SVG) format. An SVG representation (along with JavaScript) for drawing the visual design 300 of FIG. 3 on a canvas (i.e., screen of an electronic display) is shown in Code Listing 1, as follows:

Code Listing 1: Example Visual Design Specification (as SVG specification)

```
<svg xmlns="http://www.w3.org/2000/svg" xmlns:xlink="http://www.w3.org/1999/xlink"
    version="1.1" width="800" height="800" viewBox="50 50 512 512"
    xml:space="preserve">
<desc>Created with Fabric.js 1.7.2</desc>
<g id="Background" style="stroke: none; stroke-width: 1; stroke-dasharray: none; stroke-
    linecap: butt; stroke-linejoin: miter; stroke-miterlimit: 10; fill: none; fill-rule:
    nonzero; opacity: 1;" transform="translate(66 66)">
        <circle id="Background" cx="302" cy="301" r="140" style="stroke:
        rgb(124,45,127); stroke-width: 1; stroke-dasharray: none; stroke-linecap:
        round; stroke-linejoin: round; stroke-miterlimit: 10; fill: none; " transform="
        matrix(1 0 0 1 -66 -66)" />
        <circle id="Background" cx="302" cy="301" r="225" style="stroke:
        rgb(124,45,127); stroke-width: 4; stroke-dasharray: 1 12; stroke-linecap:
        round; stroke-linejoin: round; stroke-miterlimit: 10; fill: none; " transform="
        matrix(1 0 0 1 -66 -66)" />
        <circle id="Background" cx="302" cy="302" r="182" style="stroke:
        rgb(206,185,171); stroke-width: 75; stroke-dasharray: none; stroke-linecap:
        butt; stroke-linejoin: miter; stroke-miterlimit: 10; fill: none; " transform="
        matrix(1 0 0 1 -66 -66) " />
</g>
<g id="Icon" style="stroke: none; stroke-width: 1; stroke-dasharray: none; stroke-linecap: butt; stroke-
    linejoin: miter; stroke-miterlimit: 10; fill: none; fill-rule: nonzero; opacity: 1;"
    transform="translate(250 250)">
<svg width="400" height="110">
<rect id="Rectangle1" x="5" y="5" width="30" height="30" style="fill:rgb(214,191,59)" />
<rect id="Rectangle2" x="5" y="40" width="90" height="30" style="fill:rgb(31,95,123)" />
<rect id="Rectangle3" x="100" y="40" width="30" height="30" style="fill:rgb(157 ,28,32)" />
</svg></g>
<g id="MainText" transform="translate(300 210)">
<g transform="translate(-180 94) rotate(-95)">
        <text font-family="'Montserrat'" font-size="53">
                <tspan x="-16" y="16" fill="#5467FD">S</tspan>
        </text>
</g>
<g transform="translate(-178 56) rotate(-84)">
        <text font-family="'Montserrat'" font-size="53">
                <tspan x="-18" y="17" fill="#5467FD">a</tspan>
        </text>
</g>
<g transform="translate(-166 17) rotate(-72)">
        <text font-family="'Montserrat'" font-size="53">
                <tspan x="-19" y="17" fill="#5467FD">m</tspan>
        </text>
</g>
<g transform="translate(-146 -19) rotate(-60)">
        <text font-family="'Montserrat'" font-size="53">
                <tspan x="-19" y="17" fill="#5467FD">p</tspan>
        </text>
</g>
<g transform="translate(-118 -49) rotate(-45)">
        <text font-family="'Montserrat'" font-size="53">
                <tspan x="-19" y="17" fill="#5467FD">l</tspan>
        </text>
</g>
<g transform="translate(-88 -70) rotate(-33)">
        <text font-family="'Montserrat'" font-size="53">
                <tspan x="-14" y="17" fill="#5467FD">e</tspan>
        </text>
</g>
<g transform="translate(-56 -84) rotate(-23)">
        <text font-family="'Montserrat'" font-size="53">
                <tspan x="-17" y="17" fill="#5467FD"> </tspan>
        </text>
</g>
        .
        .
        .
</g>
```

```
<g id="SubText" transform="translate(303 350)">
    .
    .
    .
</g>
</svg>
```

In an embodiment, the visual design specification may define one or more groups of content elements. Each group is defined with a reference name for the content object, and the content elements contained within the group are treated as a single unit. For example, the example Visual Design Specification SVG code in Code Listing 1 includes several content objects in the form of grouped sets of individual content elements (where each group is specified between the begin group tag "<g>" and end group tag "<g>". In the example, the content objects include a Background content object (label identifier id="Background"), a Main Text content object (label identifier id="MainText"), a SubText content object (label identifier id="SubText"), and an Icon content object (label identifier id="Icon"). The Background content object in the SVG code corresponds to the background object 310 in FIGS. 3 and 3A. The Icon content object referenced as "Icon" in the example SVG code corresponds to the main text object 320 in FIGS. 3 and 3B. The Main Text content object referenced as "MainText" in the example SVG code corresponds to the main text object 330 in FIGS. 3 and 3C. The SubText content object referenced as "SubText" in the example SVG code corresponds to the SubText object 340 in FIGS. 3 and 3D.

As described earlier, and referring again to FIG. 1, a rendering application 17a, 17b, 17c is required to turn the visual design specification 16 into a device-ready specification 18a, 18b, 18c that can be processed by an output device 19a, 19b, 19c to present the visual design 21a, 21b, 21c on a presentation medium 22a, 22b, 22c. In an embodiment, at least one rendering application 17a renders the visual design specification 16 to generate a device-ready specification 18a that can be processed by a driver 20a of an electronic display 19a to output a presentation of the visual design 21a onto a screen 22a of the electronic display 19a. In an embodiment, the rendering application 17a is a Web browser 15 that interprets the visual design specification 16 and displays it on the screen 22a of an electronic display. Web browsers are generally capable of processing HTML and JavaScript code, including variations and extensions thereof, and further are capable of processing images specified in SVG format.

One application of the present invention is to simultaneously present and update images of multiple visual designs on a screen of an electronic display of a user's electronic device. In an embodiment, one use case for the simultaneous presentation and updating of multiple visual design images on a screen of an electronic display is during the selection of a design template for use in a visual design creation and editing tool. Often, an electronic visual design tool includes, or provides access to, several visual design templates. Visual design templates are pre-created visual designs that are editable using the electronic visual design tool, and are typically used by a user as a starting point for further customization and personalization. Design templates available for use with the design tool may be presented on the user's electronic display in a gallery containing a plurality of template images. Typically, the gallery includes one or more selection controls to allow the user to select an available design template for editing using the electronic visual design tool 25. The selection controls interact with the visual design selector tool 24 in FIG. 1 to present visual designs (or visual design templates) that are available for user selection, and to receive a selection from a user of one of the presented visual designs/templates. In order to expedite template selection and allow the user to quickly move on to creating and editing their visual design, a plurality of visual design templates is typically simultaneously presented on the screen of the user's electronic display in a grid- or carousel-like manner in what is referred to herein as a gallery presentation. In a gallery presentation, multiple visual designs or templates are presented simultaneously on the screen, often organized in rows and columns (and which may be automatically scrolled by the browser (with or without user input) in a spinning carousel-like manner, to allow a user to simultaneously view a plurality of available visual designs/templates for side-by-side comparison. Gallery presentation is often preferred to serially presenting visual designs one by one, because by viewing multiple choices of designs side-by-side, humans may be able to more quickly identify and select a design that meets their needs and preferences.

Figure 4A:
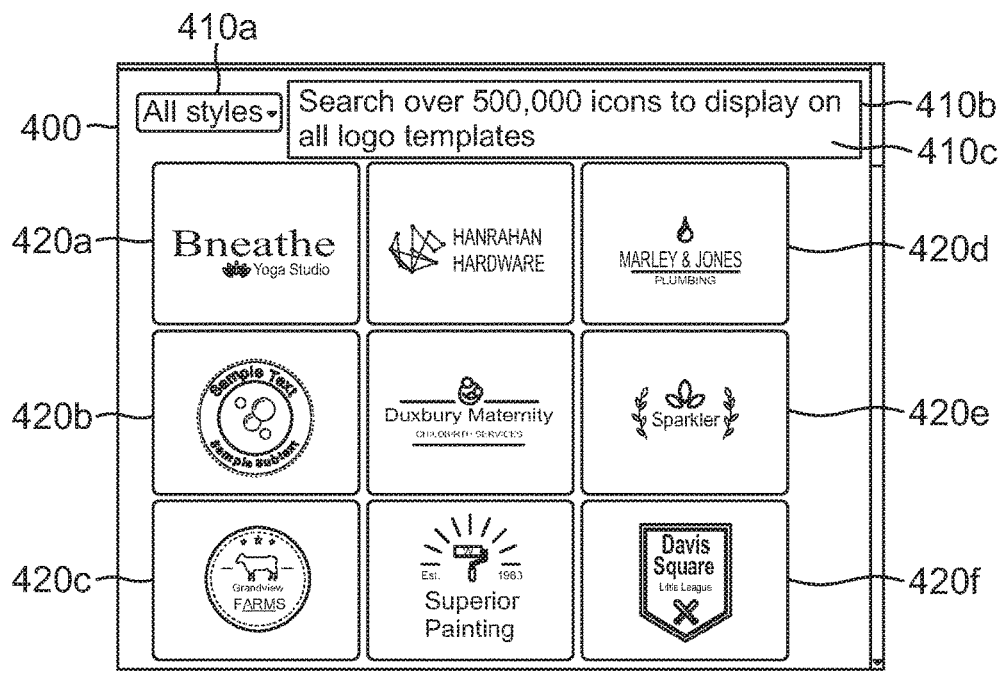
FIG. 4A is a design template gallery presentation of a plurality of images of visual designs that may be displayed in a graphical user interface presentation on an electronic display.

FIG. 4A is an example of a design template gallery presentation 400 of several available visual design templates 420a, 420b, . . . , 420f that may be selected for editing in a design selection tool. The design template gallery presentation 400 may be displayed as part of a graphical user interface (GUI) in window or browser that is displayed on an electronic display of an electronic device. In an embodiment, the GUI of the design selection tool includes a control to display a design gallery presentation 400 which presents in a grid-like manner containing multiple rows and/or columns, a plurality of images of different visual designs 420a, . . . , 420f, available for selection.

The gallery presentation 400 may include one or more filter controls 410a which allow a user to select and/or enter filter criteria. In response to a user entering filter criteria via at least one of the filter control(s) 410a the design selection tool interacts with the visual design selector tool 24 to determine, select and present a set of visual designs which match the filter criteria. In an embodiment, the filter control(s) include a category control 410a. The category control 410a may be a menu of categories, for example a drop-down menu containing available design categories. When a user selects a category, the design selection tool seeks and selects a set of visual designs which are associated with the selected category. In an embodiment, the gallery presentation 400 includes a visual object search tool 410b. In an embodiment, the visual object search tool 410b includes a keyword input control 410c, as shown. In the example illustrated in FIGS. 4A and 4B, the keyword input control 410c is a freeform text input container which accepts text input from a user. Text may be entered via an input device such as a keyboard, keypad, mouse, touchpad, voice control, etc. In an alternative embodiment (not shown), the keyword input control is a selection menu containing a plurality of different available keywords (or tags) that the user may select. In response to entry and/or selection of one or more keywords using the keyword input control 410c, the visual object search tool searches a database containing available visual objects to extract and display a set of visual objects that are related to the keyword(s).

Figure 4B:
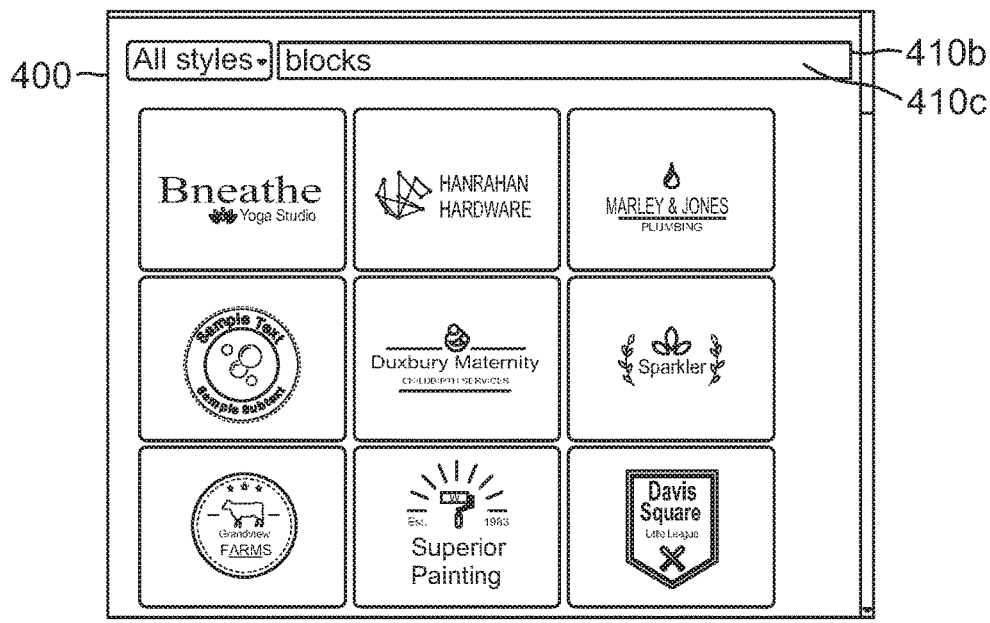
FIG. 4B is the design template gallery presentation of FIG. 4A illustrating a keyword entered in a visual object search tool.
Figure 4C:
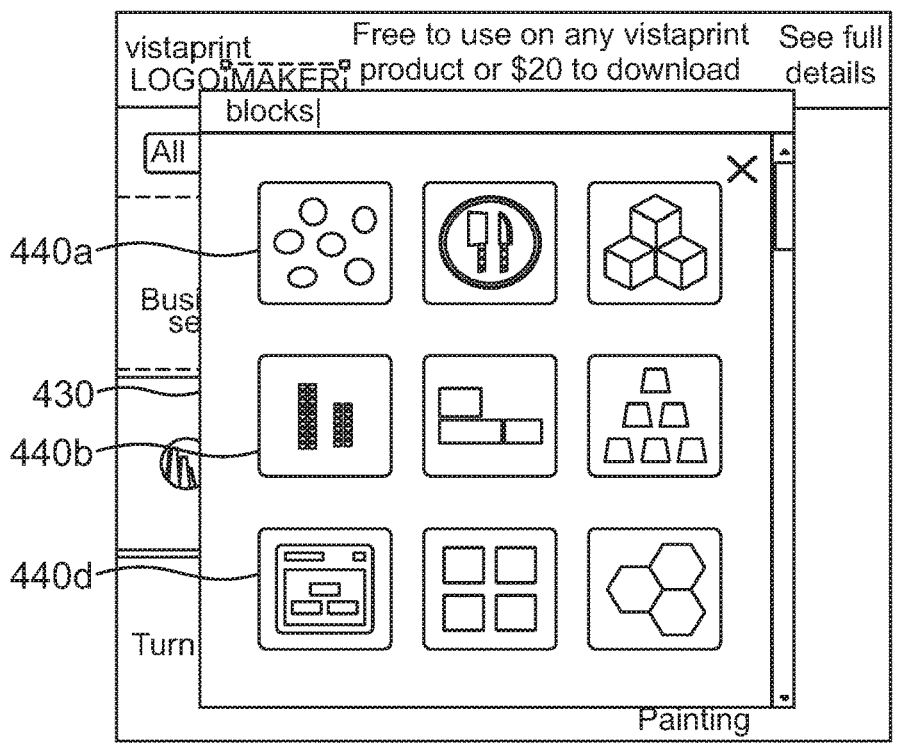
FIG. 4C is a popup window displayed in a graphical user interface that shows images of visual objects that match the keyword(s) entered in the visual object search tool of FIG. 4B.
Figure 4D:
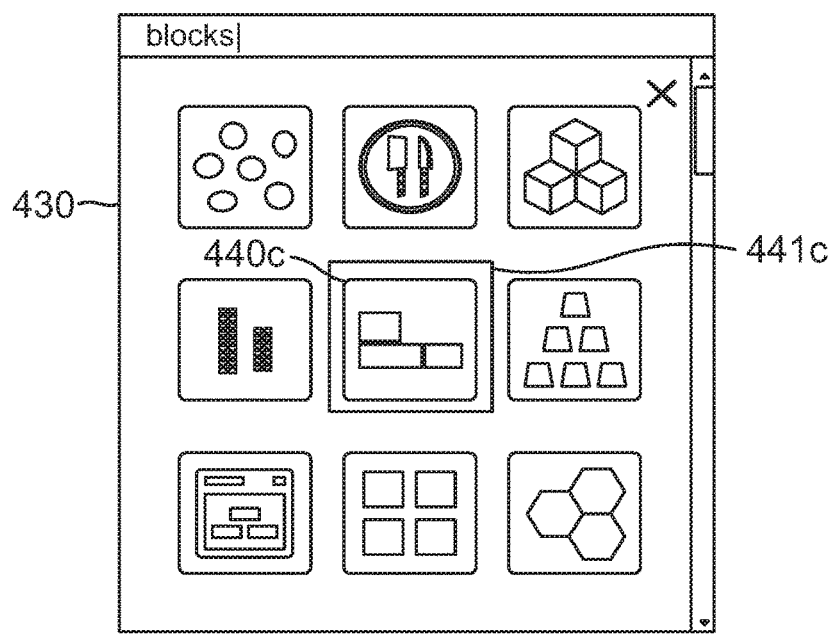
FIG. 4D is the popup window of FIG. 4C illustrating selection, in the graphical user interface, of one of the visual objects.

FIG. 4C shows a popup window 430, rendered by a browser, containing images 440a, 440b, . . . , 440d of visual objects that match the keyword(s) entered in the keyword input control 410c. In an embodiment, each image 440a, . . . , 440d, has a click control associated therewith, such that when a user clicks (using a mouse or a finger tap on a touchpad) on the image 440a, . . . , 440d, of a particular visual object, that particular visual object is incorporated into design templates that are displayed on the screen for the user. FIG. 4D shows selection of visual object 440c, indicated by the visually highlighted outline 442c around visual object 440c when the user hovers a mouse pointer or their finger over the image 440c. A click or tap on the image 440c activates the selection control 441c to select the corresponding visual object 440c.

Figure 4E:
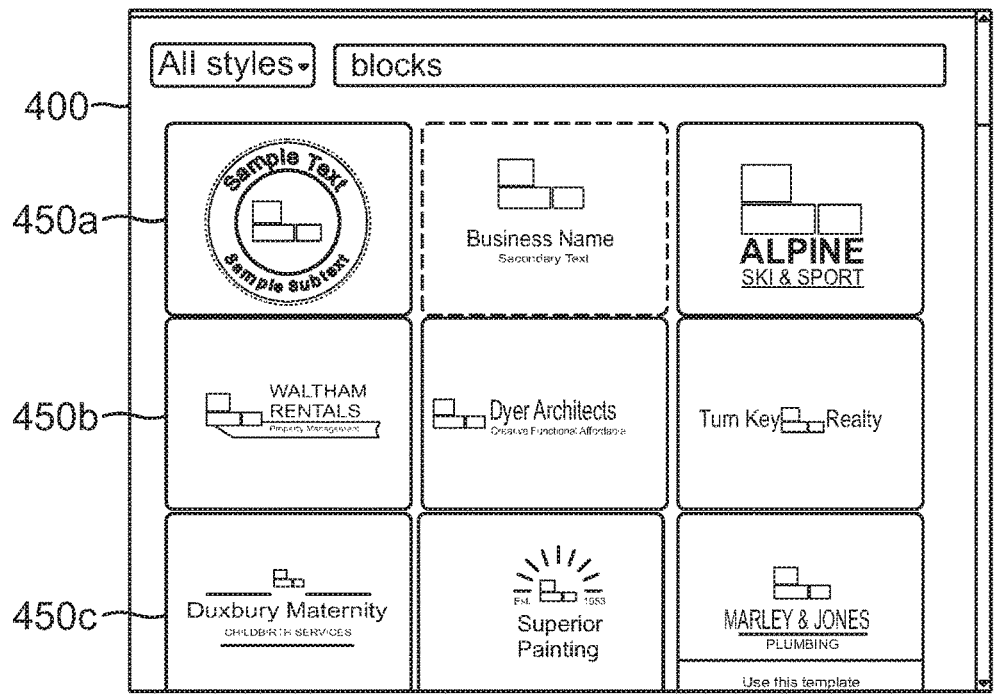
FIG. 4E is an updated version of the design template gallery of FIG. 4A that displays images of the visual designs from FIG. 4A that have been updated to incorporate the visual object selected in FIG. 4D.

Selection of a visual object 440c as shown in FIG. 4D triggers the visual design selector tool 24 to update, where appropriate, at least a plurality of the displayed design template images in the gallery 400 to include the selected visual object 440c. FIG. 4E shows the design template gallery presentation 400 updated such that at least a plurality of the visual design template images 420a, 420b, . . . , 420f of FIG. 4A are updated (as 450a, 450b, . . . , 450f) to incorporate the selected visual object 440c. In this way, the user can simultaneously view images of a plurality of different visual design templates 450a, 450b, . . . , 450f with the desired visual object incorporated therein. This allows side-by-side presentation of multiple different templates incorporating the selected visual object, and facilitates more efficient template selection decision-making by the user.

Figure 4F:
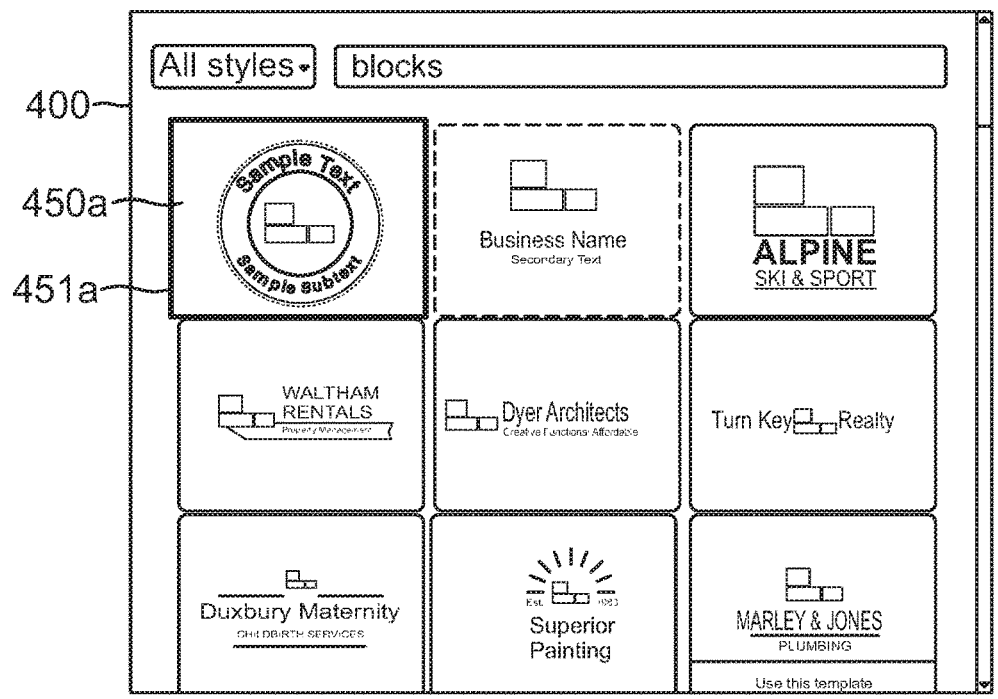
FIG. 4F is the design template gallery presentation of FIG. 4E illustrating selection of one of the displayed visual designs.

FIG. 4F illustrates the gallery presentation 400 when the user performs a hover action (by positioning a pointer via a mouse action or finger motion on a touchpad) over an image of a visual design template 450a. As illustrated, the gallery indicates that the visual design template 450a is about to be selected by placing a highlighted outline 451a around the image of the visual design template 450a (or by any other appropriate visual indication). A subsequent click by mouse or finger tap on the image of the template 450a operates to select the visual design template 450a for further operations. Such operations can include (as example only and not limitation): editing the selected visual design template in a computerized design editing tool, saving the selected visual design template for later use, printing the visual design, placing the visual design on a product, and ordering a product with the selected visual design incorporated thereon. The selection control 451a may be alternatively implemented using different control mechanisms. By way of example and not limitation, a selection control may be implemented as a checkbox, a hyperlink, a button, or other appropriate user interface event trigger mechanisms (not shown) that exist now or in the future.

Figure 5:
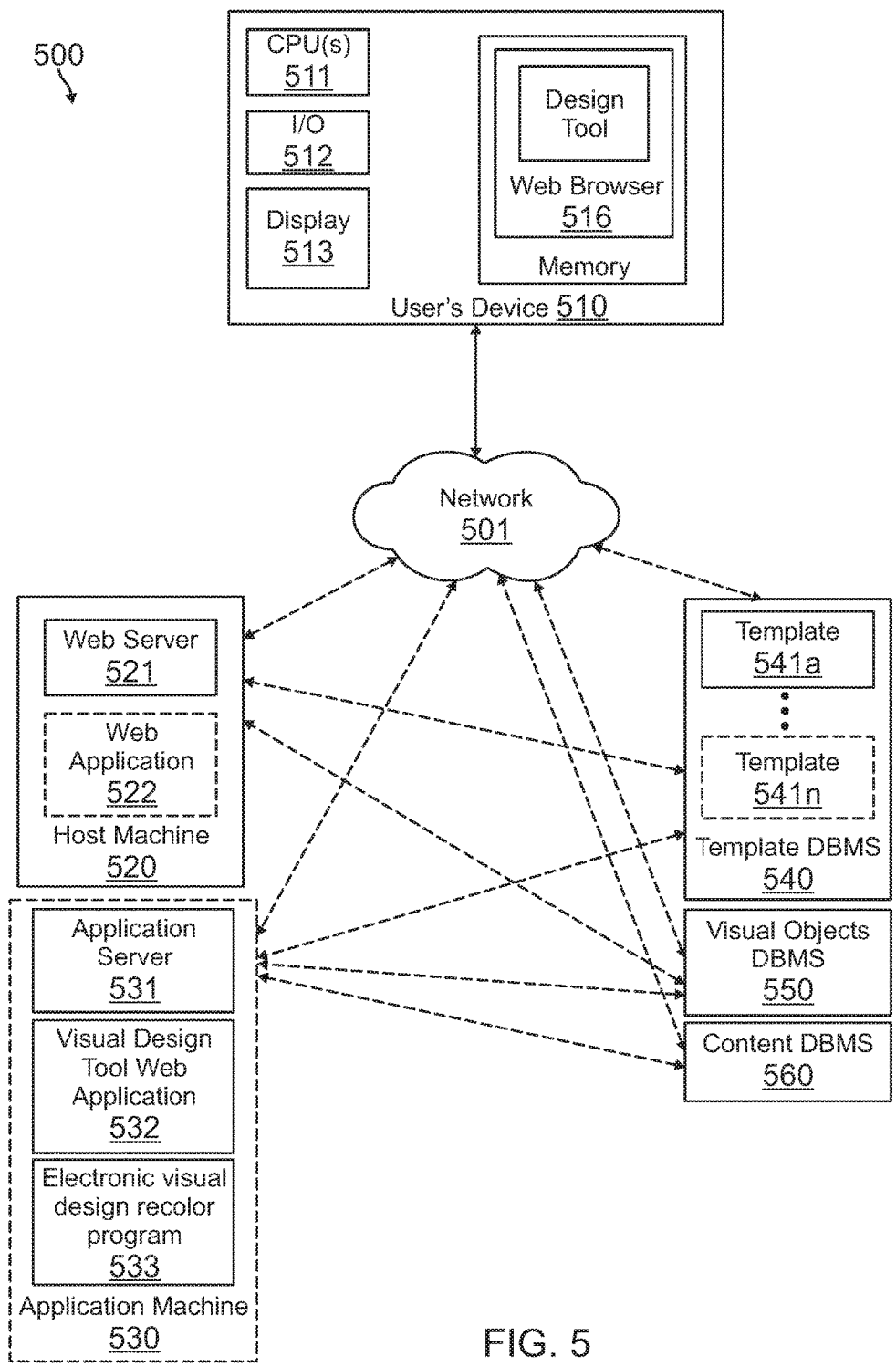
FIG. 5 is a schematic block diagram illustrating an exemplary networked computerized environment in which embodiments of the invention may operate.

FIG. 5 is a network diagram of an exemplary computerized environment 500 in which the invention may operate. The environment 500 includes a network 501 connecting a user's electronic device 510, a web server host machine 520 which hosts a web server 521, an application server host machine 530 which hosts an application server 531, a visual design template database management system (DBMS) 540, a visual object DBMS 550, and a content database management system (DBMS) 560. The network 501 comprises a combination of hardware and software to enable communication and message passing between devices connected to the network 501. In an embodiment, the network 501 is the Internet and is accessed via the World Wide Web. Devices connected to the network 501 pass messages to one another using a network protocol, such as Hyper Text Transfer Protocol (HTTP or HTTPS (secured), hereinafter "HTTP/S"). In particular, a device such as a user's electronic device 510 executes a web browser 516, used for navigating the Internet. The web browser 516 is application code which resides in computer memory 515 of the user's device 510 and is executed by the device's computer processing unit(s) (CPUs) 511. The web browser 516 includes a graphical user interface (GUI) configured to interact with a user of the device 510 via input and output (I/O) devices 512 of the user's device 510, which includes an electronic display 513. A web browser 516 enables a user device to access resources, such as documents, images, and other data, on machines connected to the Internet.

Each device 510, 520, 530, 540, 550, 560 connected to the network 501 is identified by a unique address. In HTTP/S terminology, the address is referred to as the Internet Protocol (IP) address. A web server 521 is a network application running on a host machine 520 which listens on a particular port of that machine 520. The web browser 516 is a web client (called a "user agent" in HTTP/S terminology) which can communicate with a web server 521. In order for the browser 516, or web client, to be able to communicate with the web server 521, both the browser 516 and web server 521 must use the same network protocol. In the illustrative embodiment, the network protocol used by both the browser 515 and web server 521 and other devices discussed herein is HTTP/S. Other network protocols, and/or future versions of HTTP/S could be used.

Via a web browser GUI, the web browser 516 receives input from the user, such as a Universal Resource Locator (URL). The URL may be a human-readable domain name, which represents the IP address of a resource on the Internet, and is resolved by a domain name server (DNS) (not shown) during the routing of the HTTP/S request/response to the appropriate device connected to the Internet. The web browser 516 sends HTTP/S requests to a web server 521 executing on a web server host machine 520, and receives responses from the web server 521. HTTP/S requests and responses include encapsulated payload data—i.e., data that is not part of the messaging overhead needed to route the message. When sending a request to a web server 521, the web browser 516 encapsulates request data into an HTTP/S request. The HTTP/S request will include the name of the resource, and depending on the type of request (e.g., a GET, POST, etc.), may include additional data such as form data, image data, etc. A web server 521 receives an HTTP/S request from a web browser 516, extracts the payload data encapsulated in the HTTP/S request, and passes it to an appropriate server-side handler program. The server-side handler program generates response data, which is encapsulated into an HTTP/S response and sent by the web server 521 back to the web browser 516. The web browser 516 receives the HTTP/S response from the web server 521, extracts the encapsulated data from the HTTP/S response, and processes the payload data, performing logic and other operations based on the extracted response data. Often, the payload response data is in the form of HyperText Markup Language (HTML), Cascading Style Sheet (CSS), JavaScript, JavaScript Object Notation (JSON), Application Program Interface (API) structured data, and other data such as images and flash content, which a web browser can process. A typical operation performed by the web browser 516 is to render a web page for display on an electronic display 513 of the user's electronic device 510 according to instructions and/or data contained in the HTTP/S response payload data.

As mentioned, a server-side handler program processes payload data extracted from the HTTP/S request, and performs logic and other operations based on the extracted request data, such as retrieving an HTML page, performing logic based on form data, reading, writing, updating, creating, and/or deleting data from a database, etc. In operation, when a web server 521 receives an HTTP/S request directed to its unique IP address, it identifies the correct handler program (which may be present on the same machine 520 as the web server 521, or may be passed to a local application server (not shown) or an application server 531 present on a remote machine 530. The identification of the program for handling the request is encoded in the HTTP/S request itself, and/or is implicitly understood by the web server 521. The web server 521 includes logic for passing the request (or at least a relevant portion thereof) to the proper handler program for handling the request. If the proper computer program for handling the request is unavailable or not found by the web server 521, the web server 521 may send the request to an error handling program which prepares the response. The handler program may be resident on the web server's local machine 520, or may be resident and/or accessible via a remote machine 530, or a database management system (DBMS) or other web service (not shown), in which case the web server 521 may generate its own HTTP Request to the machine hosting the remote computer program, or may issue a redirect response.

Regardless of where the correct computer program for handling the request is located, once the request is passed to such server-side handler program, the handler program processes the request to generate a response. The handler program may be computer readable program instructions which execute on the web server 521 or application server 531. The handler program may operate to retrieve and return a web page, such as an HTML page or image. It may alternatively perform server-side logic to dynamically generate a response, and/or redirect the request, and/or call or pass on the request to other program(s) such as server-side JavaScript, applets, servlets, CGI scripts, Active Server Pages (ASPs), etc. The response payload data may contain browser-renderable format data such as HTML, JavaScript, CSS, etc. (which may be encoded in serialized JSON or other such data that may be decoded in the browser). The response payload data may also or alternatively contain image data in a format such as .jpg, .svg, etc. or other data that can be interpreted by the browser or extracted by script running in the browser.

Referring again to FIG. 1, an electronic visual design tool 25 may be implemented as a web application in a networked environment. For example, electronic visual design tool 25 may be implemented as an electronic visual design tool web application 522 executing on a machine 520 that hosts a web server 521. Alternatively, the electronic visual design tool 25 is an electronic visual design tool web application 532 executing on a machine 530 that hosts an application server 531, and is accessed via an application server 531. In an embodiment, a browser 516 executing on a user's device 510 communicates with an electronic visual design tool web application 522 or 532 via a web server 521 or application server 531.

Figure 6:
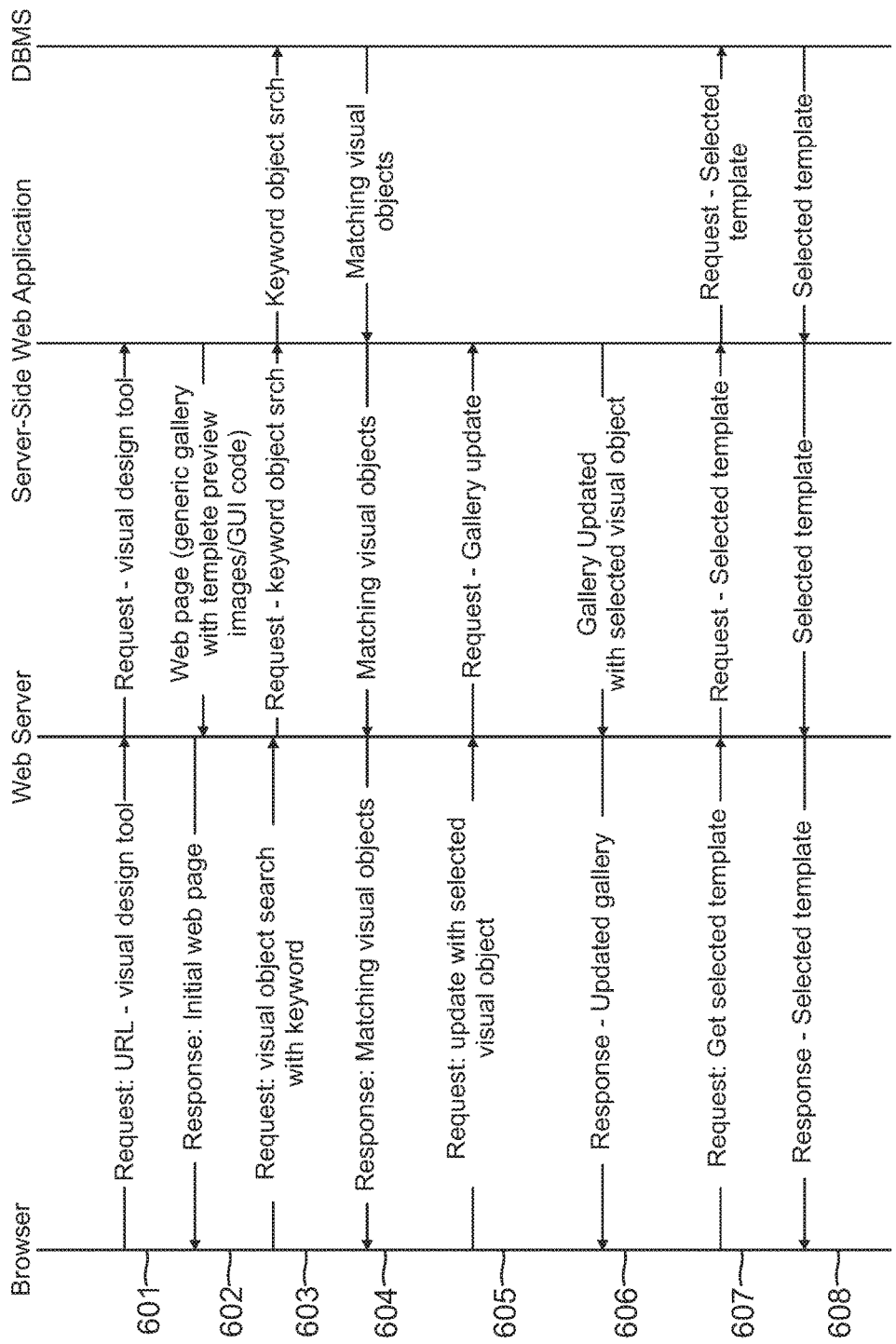
FIG. 6 is a network communications diagram illustrating communications between networked components in FIG. 5.

FIG. 6 shows exemplary communications that pass between the web browser 516 and web server 521. As illustrated, the user enters the URL of the electronic visual design tool web application 522 into the address bar of the browser 516, which in step 601 triggers an HTTP/S request for the resource located at the URL. The web server 521 receives the HTTP/S request, and passes it to the local electronic visual design tool web application 522 running on the web server machine 520. The electronic visual design tool web application 522 retrieves an initial web page including GUI code implementing a client-side design tool 517 that is to be downloaded to the client user's device 510 to execute within the browser 516. The initial web page data is returned by the electronic visual design tool web application 522 to the web server 521, which encapsulates it into an HTTP/S response and sends it to the web browser 516. (It is to be understood that while HTTP/S requests and responses in FIG. 6 are illustrated and represented as single response/request transactions, a given request and response often triggers multiple additional HTTP/S request/response transactions to load additional content (for example, images, separately located JavaScript files, etc.)). The web browser 516 receives the HTTP/S response data, including the initial web page and GUI code, and renders the web page presentation 517 in a browser window on the electronic display 513 of the user's device 510. An example of such displayed web page is shown in FIG. 4A. In the illustrative embodiment, the initial web page comprises a gallery 400 of images 420a-420f of unpersonalized visual design templates. In other embodiments, a different initial web page may be displayed, and such page may or may not include a presentation gallery as part of such page. Through a series of one or more HTTP/S requests and responses (step 602), eventually a user may be presented with a gallery 400 of images 420a-420f of available templates, such as that shown in FIG. 4A. In an embodiment, the template images 420a, ..., 420f are in a rasterized format such as .png, .jpg, etc. In an alternative embodiment, the template images 420a, ..., 420f are in a vector format such as the scalable vector graphic (SVG) format.

Continuing with the communications flow in FIG. 6, following the flow of web pages displayed in FIGS. 4A-4F, in FIG. 4B a user may enter a keyword (in this example, "blocks") into the freeform text input container of the keyword input control 410c. The entry of the keyword into the container may trigger, in step 603, an HTTP/S request from the browser 516 to the web server 521. The web server 521 passes the request to the electronic visual design tool web application 522. The electronic visual design tool web application 522 includes a software function corresponding to the keyword input control, which issues a request to a visual object DBMS 550 to return a set of visual objects that match the keyword (i.e., "blocks"). In an embodiment, each visual object in the set is in a SVG format. The DBMS 550 returns to the keyword input control function a set of visual objects that match the keyword, which passes to the electronic visual design tool web application 522. The electronic visual design tool web application 522 packages the set of matching visual objects into a data structure usable by the web server 521, and the web server 521 encapsulates the data structure into an HTTP response, which it sends to the web browser 516 (see step 604). The web browser 516 extracts the encapsulated data and generates the popup window shown in FIG. 4C. In an embodiment, each displayed visual object 440a-440b is an SVG object. In an alternative embodiment, the displayed visual object is in a raster format such as a .jpg format.

When a user selects an object 441c from the popup window 430 in FIG. 4D, in step 605 the web browser 516 generates an HTTP/S request, which includes as payload data at least an identifier of the selected visual object. The web server 521 processes the HTTP/S request, passing the request to the electronic visual design tool web application 522. The electronic visual design tool web application 522 extracts the identifier of the selected visual object, and updates the set of visual design templates to incorporate the selected visual object corresponding to the identifier, and sends images of the updated set of visual objects as payload data to the web server 521. In step 606, the web server 521 generates an HTTP/S response containing the images of the updated set of visual design templates, and sends the HTTP/S response to the browser 516. The browser 516 extracts the images of the updated set of visual design templates and re-renders the gallery 400 to contain the images of the updated set of visual design templates 450a-450f, as shown in FIG. 4E.

Figure 11:
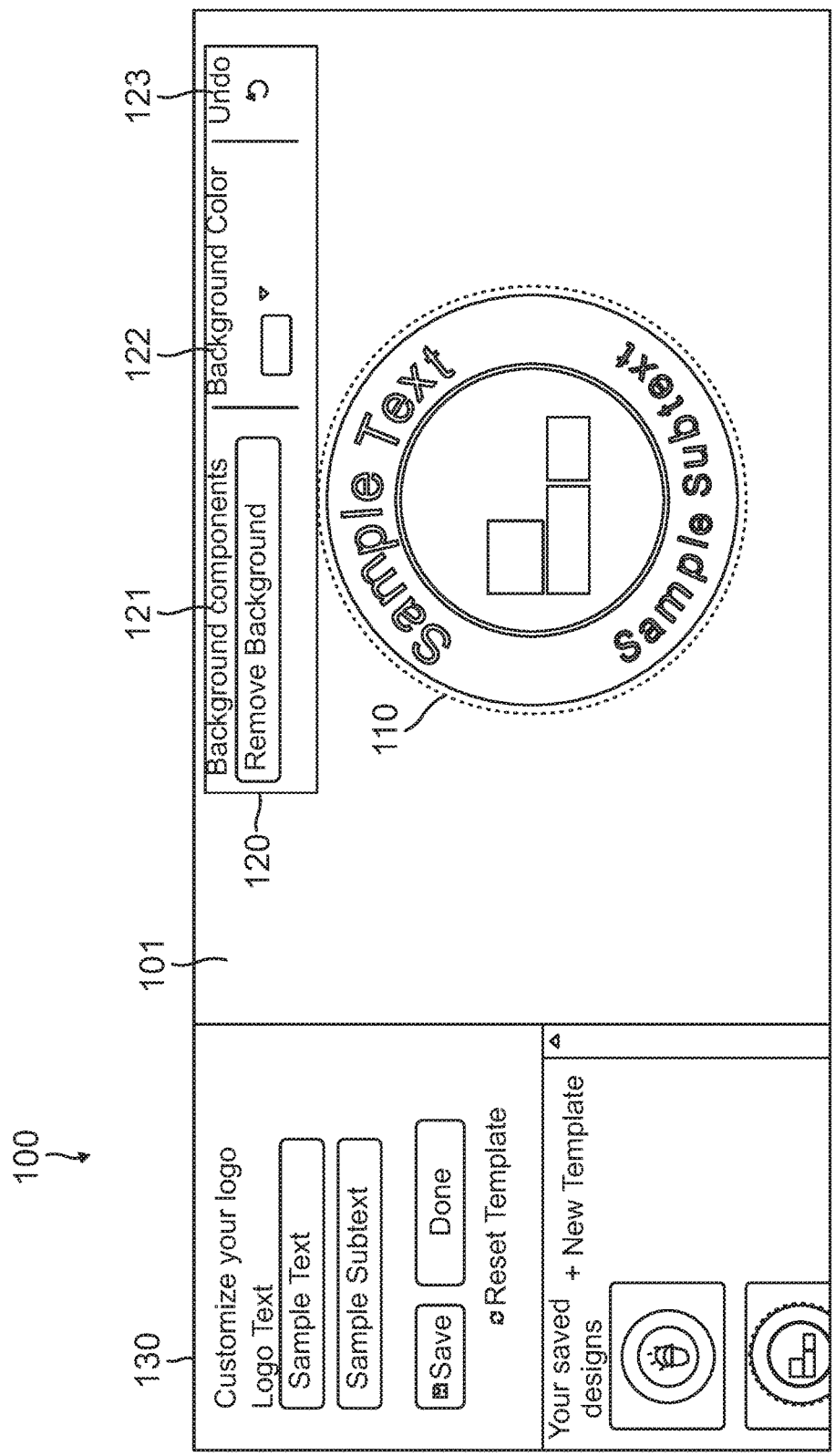
FIG. 11 is a design tool graphical user interface presentation displayed on an electronic display from which a user can view and edit a selected visual design.

In FIG. 4F, a user selects a visual design template 450a, and the selection triggers the browser (see step 607) to send an HTTP/S request to the web server 521, which passes the request to the electronic visual design tool web application 522. In step 608, the electronic visual design tool web application 522 extracts the identifier of the selected template from the request payload data, retrieves a visual design template corresponding to the identifier from the visual design template database 530 and updates it to incorporate the selected visual object, and packages the visual design template data into a form usable by the web server 521 for sending to the browser 516. The web server 521 generates an HTTP/S response containing the selected visual design template specification, and sends it to the web browser 516. The web browser 516 extracts the visual design template specification, and executes a portion of the design tool GUI which allows the user to view and edit the visual design template. An exemplary embodiment of a design tool GUI 100 is shown in FIG. 11, and includes a work area 101 where a presentation 110 of the selected visual design template is presented. The GUI 100 includes a context-sensitive toolbar 120, which includes individual controls such as component controls 121, color controls 122, and undo editing control 123. The GUI 100 also includes text form menu 130 that includes text input boxes for each text field that appears in the visual design.

Returning now to FIG. 4A, in an embodiment the construction of the gallery 400 as a web page includes several HTML DIV elements, which are containers in which content is inserted by the browser, arranged in a grid of rows and columns. Each DIV element is configured to contain an image of a visual design template. In an embodiment, the image is a .png or .jpg format. In an alternative embodiment, the images of the visual design templates could be in vector format, such as SVG format. In either case, the web browser 516 includes a rendering application which converts the images from the .jpg or .svg format to a device-ready specification that the output driver of the electronic display recognizes in order to display the images on the screen of the electronic display. Each image depicts a different available visual design template available for selection by a user interacting with the GUI.

Many tools exist for web development, and one preferred embodiment for implementing the GUI is to use HTML5, JavaScript, and a library of window canvas manipulating tools such as Fabric.js, which provides utilities for controlling HTML5 canvas elements as objects so that individual canvas elements can be manipulated without the browser having to redraw the entire canvas. Fabric.js shapes can be defined as variables ("var") in the JavaScript, and the shape properties can be specified in JSON format. Fabric shapes can be drawn on the canvas, and each shape is independently manipulable (translation, scaling, animation, etc.) via HTML, HTML5, Fabric.js and JavaScript methods.

A simplified HTML web page specification for a gallery is shown in Code Listing 2, as follows:

Code Listing 2: Example HTML Gallery Web Page Specification

```
<html>
<head>
<title> LogoMaker website</title>
</head>
<body>
    <div id="container">
        <div id="header">
            ...
        </div>
        <div id="galleryContainer">
            <div id="template1">
            <div class="preview">
                    <img src="/api/templatePreview/1234?imageId=78637"
                        style="transform: scale(1.8);">
            </div>
            </div>
            <div id="template2">
            <div class="preview">
                    <img src="/api/templatePreview/2345?imageId=23364"
                        style="transform: scale(1.8);">
            </div>
            </div>
            .
            .
            .
            <div id="templateN">
            <div class="preview">
                    <img src="/api/templatepreview/9876?imageId=23470"
                        style="transform: scale(1.8);">
            </div>
            </div>
        </div>
    </div>
```

```
</body>
</html>
```

The gallery is contained in an HTML DIV element identified as "galleryContainer" (id="galleryContainer"). The DIV element identified as "galleryContainer" contains a number of template containers in the form of DIV elements identified as id="template1", id="template2", through id="templateN" in which respective images are inserted by the browser.

In an embodiment, the images inserted into the template containers are in a rasterized format such as .jpg, .png, etc. They can be in rasterized format prior to user selection if gallery updates are performed server-side. In an alternative embodiment, the images inserted into the template containers are in a vector format such as .svg format files, which makes it possible to update the content of the gallery images on the client.

Figure 7A:
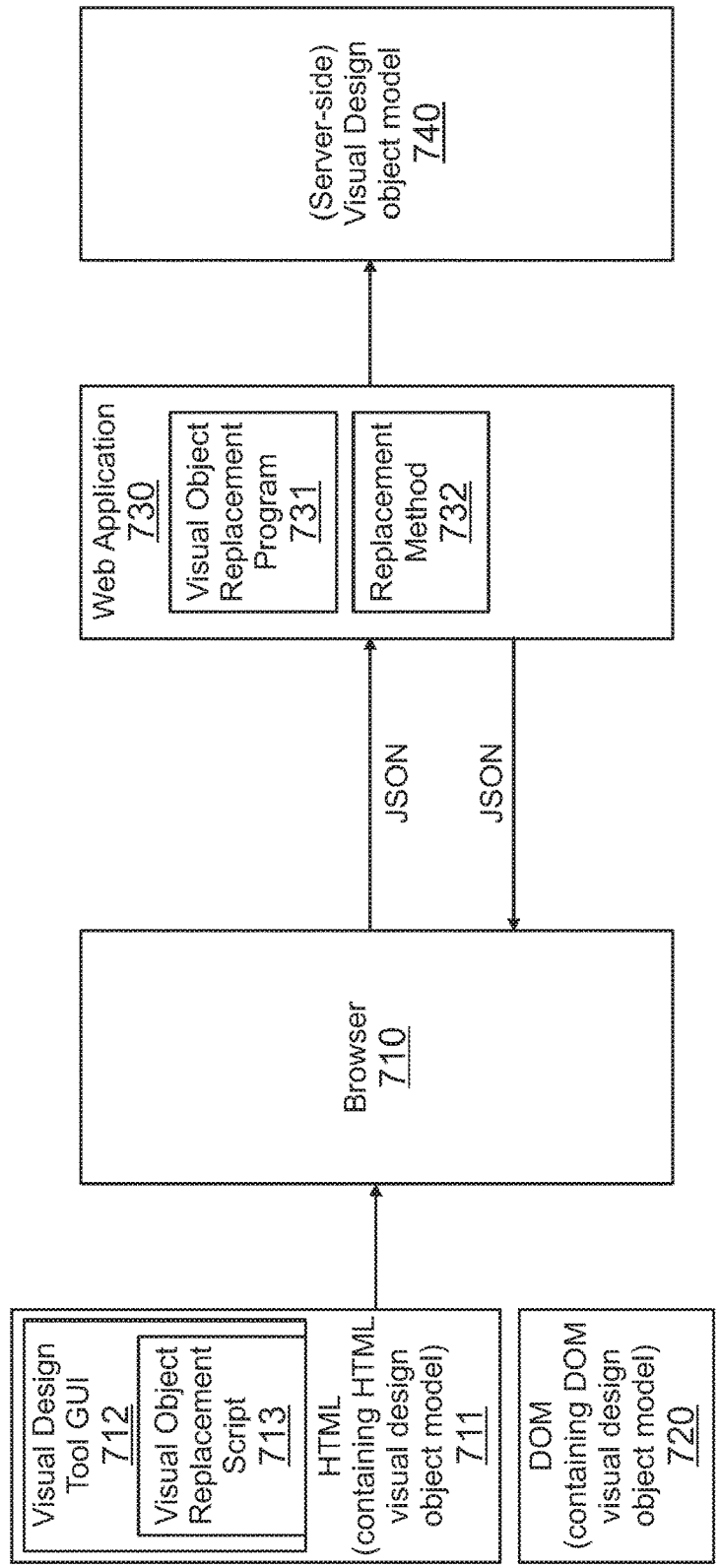
FIG. 7A is a schematic block diagram illustrating a first model in which images of visual designs presented in a presentation gallery can be updated with replacement images of corresponding visual designs updated to contain a desired visual object.

FIG. 7A is a schematic block diagram illustrating a first model in which images of visual designs presented in a presentation gallery can be updated with replacement images of corresponding visual designs updated to contain a desired visual object. In this embodiment, a desired visual object is selected by a user via a GUI 712 presented in a window of a web browser 710 operating on a client device. A visual object identifier corresponding to the selection is passed to a web application 730 running on a host machine. The web application 730 maintains a server-side representation (referred to herein as a server-side visual design object model 740) of each of the visual designs that have been sent to the client device for display in the presentation gallery in the browser window of the client device. The web application 730 is generally written in a language that can be compiled and turned into executable program instructions. For example, a web application 730 may be written in a language such as C#, Visual Basic .NET, or other computer programming languages that compile into a standard platform-neutral Common Intermediate Language (CIL) program that can in turn be compiled by a platform-specific Common Language Runtime (CLR) engine into platform-specific computer readable code that can be executed on a platform-specific machine that hosts the web application. The platform specific executable code that runs on the host machine maintains its own data structure to model the visual design. Thus, in a client-server model such as in FIGS. 5, 7A and 7B, there are at least two different visual design object models—a client-side visual design object model and a server-side visual design object model.

Typically, the server-side visual design object model 740 is in the form of an object or class characterized by a set of key attributes and corresponding attribute values (i.e., properties) and/or methods (also called functions). For example, a server-side visual design object model for a visual design template, such as the template shown in FIG. 3, may be defined as a class called "Template" having key attributes defining a background, an icon, a main text, and a subtext. When a template class is instantiated, the instantiated template object is assigned to a name (i.e., a variable name). The name is an identifier of the specific instantiated object and operates as an identifier through which object attributes and methods are accessed. For example, a template class may be defined in C#, for example as shown in Code Listing 3, as follows:

Code Listing 2: Example C# Code Defining a Template Class

```
class Template
{
        private string background;
        private string maintext;
    private string subtext;
    private string icon;
    public string Background
    {
        get { return background; }
        set { background = <background value>; }
    }
    public string Icon
    {
        get { return icon; }
        set { icon = <icon value>; }
    }
    public string Maintext
    {
        get { return maintext; }
        set { maintext = <maintext value>; }
    }
    public string Subtext
    {
        get { return subtext; }
        set { subtext = <subtext value>; }
    }
}
```

The <background value>, <icon value>, <maintext value>, and <subtext value> may be visual object specifications (such as SVG or .jpg format) or may be reference values specifying the a location or URL of the resource containing the actual visual object specification. A server-side visual design object model 740a can be created by instantiating a Template object named Template1 as follows (in C# code):

Code Listing 4: Example C# Code Instantiating Template Class and Setting Values of Template Class Attributes

```
Template Template1 = new Template( );
Template1.Background.set = Background1;
Template1.Icon.set = Icon1;
Template1.Maintext.set = Maintext1;
Template1.Subtext.set = Subtext1;
``` where the values of Background1, Icon1, Maintext1 and Subtext1 correspond to actual visual object specifications, or are variables set to actual visual object specifications, and/or are pointers to the location of the respective visual object specifications. In an embodiment, the Template DBMS 540 stores each visual design template definition as a set of respective attribute-value pairs, such as an XML or JSON-like format, where each visual design template definition comprises a respective key attribute corresponding to respective Background attribute, Icon attribute, Maintext attribute, and Subtext attribute, and corresponding attribute values comprising the specific visual object specification, or pointer thereto. The attribute values of the key attribute identifiers are set to different values across different Template definitions 541a, . . . , 541n, and are pulled from the Template DBMS 540 (or from a resource pointed to by attribute value(s)), during instantiation of the template objects 740a, ..., 740d to set the initial attribute values of the template objects.

Additional templates Template2, ..., TemplateN are instantiated similarly, creating visual design object models 740b, 740c, 740d (FIG. 7A), where the value of each of the Background, Icon, Maintext, and Subtext attributes are set to different values across different Template objects 740a, ..., 740d. In this way, a number of different visual designs are represented in different visual design templates in the visual design template database 540.

When the executable web application program 730 instantiates a Template class, it generates a corresponding visual design object model 740a, 740b, 740c, 740d in server-side computer memory. In an embodiment, each of the .Background, .Icon, .Maintext, and .Subtext design elements is set to an attribute value that either itself comprises, or is a reference to a location that comprises, a browser-renderable specification (i.e., HTML, SVG, etc. code) that specifies for a browser how to render that particular element. In an embodiment, the specification for graphical elements, such as the icon and background, comprises a string of SVG code.

The web application 730 performs the functions necessary to enable and cooperate with the electronic visual design tool GUI 712 running in the client browser 710. One of these functions is to identify a (possibly filtered) set of available visual design templates and to send images of those visual design templates to the electronic visual design tool GUI 712 for display in a presentation gallery (such as shown in FIGS. 4A-4F). In an embodiment, a filtered set of template objects 740a, 740b, 740c, 740d rendered into image format by a rendering application 733. In an embodiment, the image format is a raster image format, such as .jpg format. In an alternative bme the image format is SVG format. The application server for the web application 730 translates the images into JSON representation, which is serialized and encapsulated into HTTP/S response(s), and sent to the web browser 710 executing on the client device.

On the client side, the web browser 710 extracts and deserializes the JSON representation of the template images and renders them on the screen of the electronic display in accordance with the web page specification HTML page code 711. The GUI code 712 in the HTML web page 711 contains script, such as JavaScript, that enables the GUI functionality of the electronic visual design tool 25, including the display of a visual design presentation gallery.

The GUI code 712 further includes code implementing a visual object search and replace tool. When a user searches for and selects a visual object such as an icon, the GUI operates to request updated template images and to update the gallery with the updated template images that incorporate the selected visual object, as described previously in connection with FIGS. 4A-4F. The GUI 712 can do this in one of several ways.

In a first embodiment, the GUI 712 sends a request to the web application 730 requesting the web application 730 to perform the update to the template images and to send the updated set of template images back to the GUI 712 for display in the browser. The HTML page code 711 includes script 713, such as JavaScript or variations and/or extensions thereof to implement the client-side functionality to obtain the identifier for the desired replacement visual object (i.e., an id associated with the selected replacement icon). The script may include script for implementing the search tool 410b (FIGS. 4A, 4B), visual object presentation gallery (popup window 430 in FIGS. 4C, 4D), and icon selection tool 441c (FIG. 4D). In this first embodiment, the web application 730 includes or accesses a server-side visual object replacement function or program 731 that includes computer-readable program instructions that implement the functionality for replacing existing icons in the server-side visual design object model 740 of each of the designs that correspond to the those visual design template images 420a, ..., 420f that are currently displayed in the presentation gallery 400 (see FIGS. 4A-4F) with the selected icon 440c (see FIGS. 4D-4F). The web application 730 can perform this task by executing code corresponding to a replacement method 732 on the machine that hosts the web application handler program, for example, web application host machine 530 from FIG. 5. In an embodiment, the code includes instructions to retrieve the SVG specification corresponding to the visual object associated with the identifier associated with the selected replacement icon, and then to call the "set" method of the corresponding Template object (for example, Template1.set.icon( )). Once the server-side visual design object model 740 for each of the displayed visual designs 420a, ..., 420f, is updated to incorporate the selected icon 440c, a server-side rendering application 733 renders updated images 450a, ..., 450f based on the visual design object models 740a, ..., 740d and the web application 730 returns the updated images 450a, ..., 450f to the GUI 712. In an embodiment, the rendering application 733 generates the images in a raster format such as a .jpg format (or other such raster image formats), where the individual design elements of the visual design (such as the background, icon, maintext and subtext) cannot be extracted—i.e., the image is a pixel image and the individual pictoral elements depicted therein are not individually selectable as a whole. In an alternative embodiment, the images of the updated visual designs that are sent to the GUI 712 are in a scalable vector image format, such as SVG or other vector formats. In such embodiment, the images of the updated visual designs can be sent piecemeal, as a set of key attribute id-value pairs (for example, in JSON format), where each key attribute id corresponds to a graphical element in the visual design and its corresponding attribute value comprises an SVG image specification.

Figure 7B:
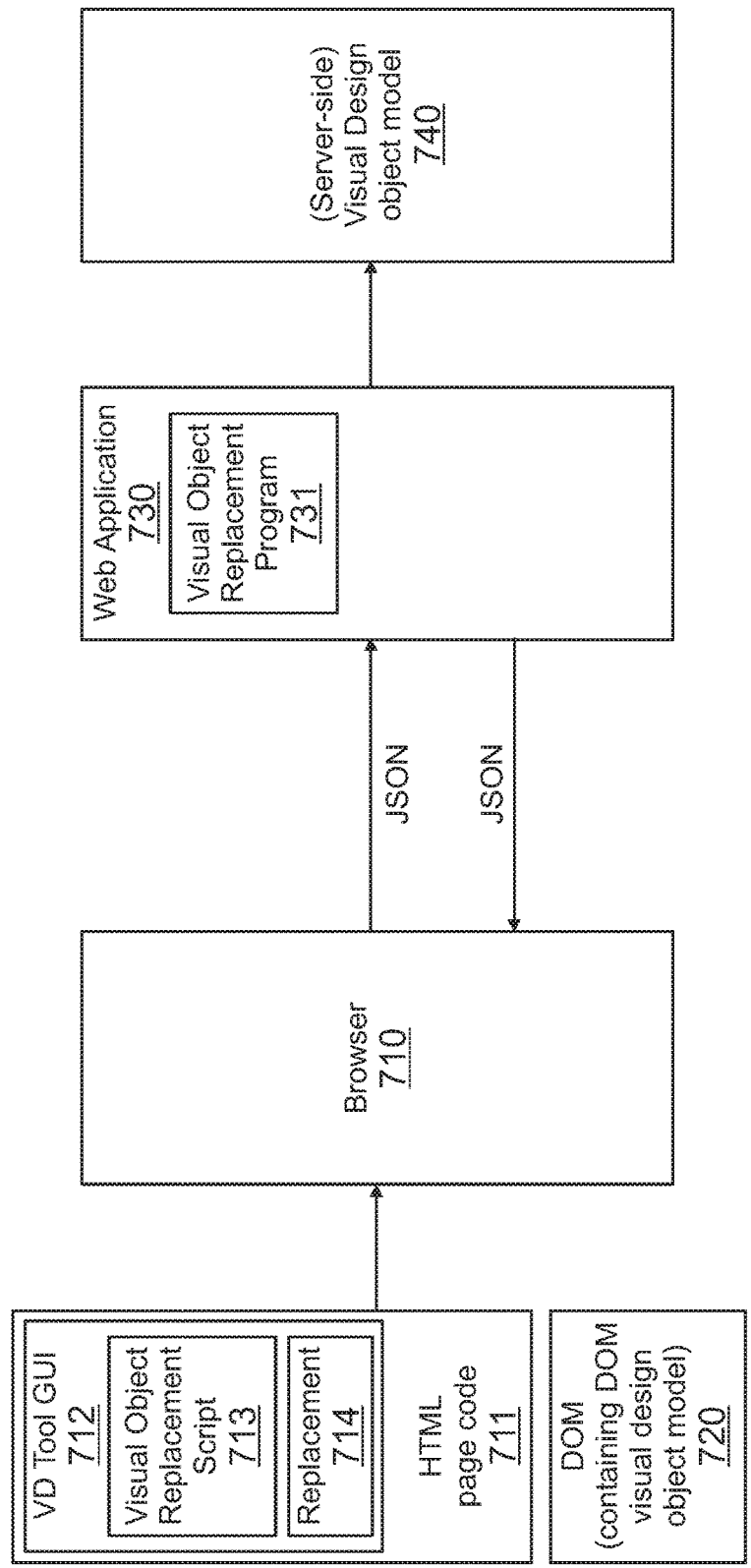
FIG. 7B is a schematic block diagram illustrating a second model in which images of visual designs presented in a presentation gallery can be updated with replacement images of corresponding visual designs updated to contain a desired visual object.

In a second embodiment, illustrated in FIG. 7B, the GUI 712 itself performs the functionality to replace existing icons in the images of visual designs displayed in the presentation gallery with the selected icon. In this embodiment, each template image 420a, ..., 420f displayed in the gallery 400 is required to be in a format that allows identification and replacement of individual elements (e.g., Background, Icon, Maintext, Subtext) contained within the template image. For example, in an embodiment, the template images 420a, ..., 420f are specified in SVG format such that a replacement script 714 can operate to find and replace the existing icons in the SVG images with the selected icon. In this embodiment, a GUI replacement script 714 operates to search for HTML/SVG tags corresponding to a template identifier (e.g., search for "<g Id="icon">"and corresponding end tag"</g>"), and then for each identified template identifier, to search the template SVG code for the "icon" identifier and replace and/or manipulate the corresponding "icon" SVG specification in the HTML page 712 to incorporate the SVG specification of the replacement visual object into its corresponding template specification. In this embodiment, the current state of the visual object object model (maintained in the DOM 720) is updated at the local client machine, and may not result in the immediate update of a corresponding server-side visual design object model 740. For example, the server-side visual design object models 740a, ..., 740d corresponding to an updated client-side visual design object model 720 may not occur until one or more events, such as the passing of a certain amount of time, and/or a user selection event corresponding to one of the displayed images of visual design templates.

In a third embodiment, for example a captured schematically in FIG. 1, the electronic visual design tool 25 may be a standalone application that executes on a local device without the need for access to the web. In such embodiment, the templates, replacement visual objects, GUI, visual object replacement program, etc. are each stored on and/or are accessible by the user's device. Other embodiments may be implemented without departing from the scope of the invention.

Returning to FIG. 5, the visual design template database 540 stores a plurality of visual design templates 541a, . . . , 541n. The visual design templates 541a, . . . , 541n contain at least one element comprising, or referencing, a visual object specification in a vector graphic format. In a preferred embodiment, the vector graphic format is SVG format. In a preferred embodiment, the entire visual design template 541a, . . . , 541n is specified in SVG format. Each visual design template SVG object includes at least one SVG element that is associated with a key attribute identifier that is part of a set of common template element identifiers. For example, each visual design template 541a, . . . , 541n may include one or more individually referenceable SVG objects that are each identified using the same corresponding labels across different templates. Across different templates, the content/specification of each correspondingly-labeled SVG object may be different, and the specific content in each template is accessible via the corresponding label. Grouped element objects across different templates use identical labels for corresponding grouped element objects. This schema allows for simple mapping of visual design element across templates, and simplifies client- and server-side representation of template elements. For example, referring to the visual design template 300 illustrated in FIG. 3, the visual design template 300 includes a background corresponding to an SVG object associated with the identifier "Background", a graphical icon corresponding to an SVG object associated with the identifier "Icon", a first text element corresponding to an SVG object associated with the identifier "MainText", and a second text element corresponding to an SVG object associated with the identifier "SubText". A second template may be represented by an SVG object that includes a different specification for each of the labeled element groups (Background, Icon, Maintext, Subtext), and while the specifications for each labeled group Background, Icon, Maintext, Subtext, may be different from the specifications of like groups in other templates, the identifier label for each of the Background, MainText, SubText and Icon is the same across the different templates. The individual template grouped element labels (e.g., id="Background", id="Icon", etc.) can operate as keys in a key-value pair model, where the label value corresponds to the "key" in the SVG specification, and the specification following the key in the SVG object is the "value" of the key-value pair. In an embodiment, each template contains at least one or more of a "Background" SVG object, an "Icon" object, a "MainText" object, and/or a "SubText" object. By standardizing the visual design templates to include correspondingly-labeled (or "keyed") SVG objects whose values can vary from template to template, the elements of each template can be easily mapped to key-value pairs. The mapping of SVG objects in the visual design templates into key-value pairs enables translation of the template into various representations of the visual design object model used by each of the web browser 516, the web server 522, the application server 532, the electronic visual design tool web application (e.g., the server-size computer program), and the template DBMS 540. The key-value mapping further enables simplified browser-side and server-side manipulation of design elements in a selected design template during the creation by a user of a customized visual design via the electronic visual design tool 25. For example, templates that are represented in SVG format include key attribute ID and corresponding attribute values comprising SVG objects (for example, keyed by their respective group identifiers, "id="<key>, where <key> is "Background", "Icon", "Maintext", and "Subtext".

Figure 8:
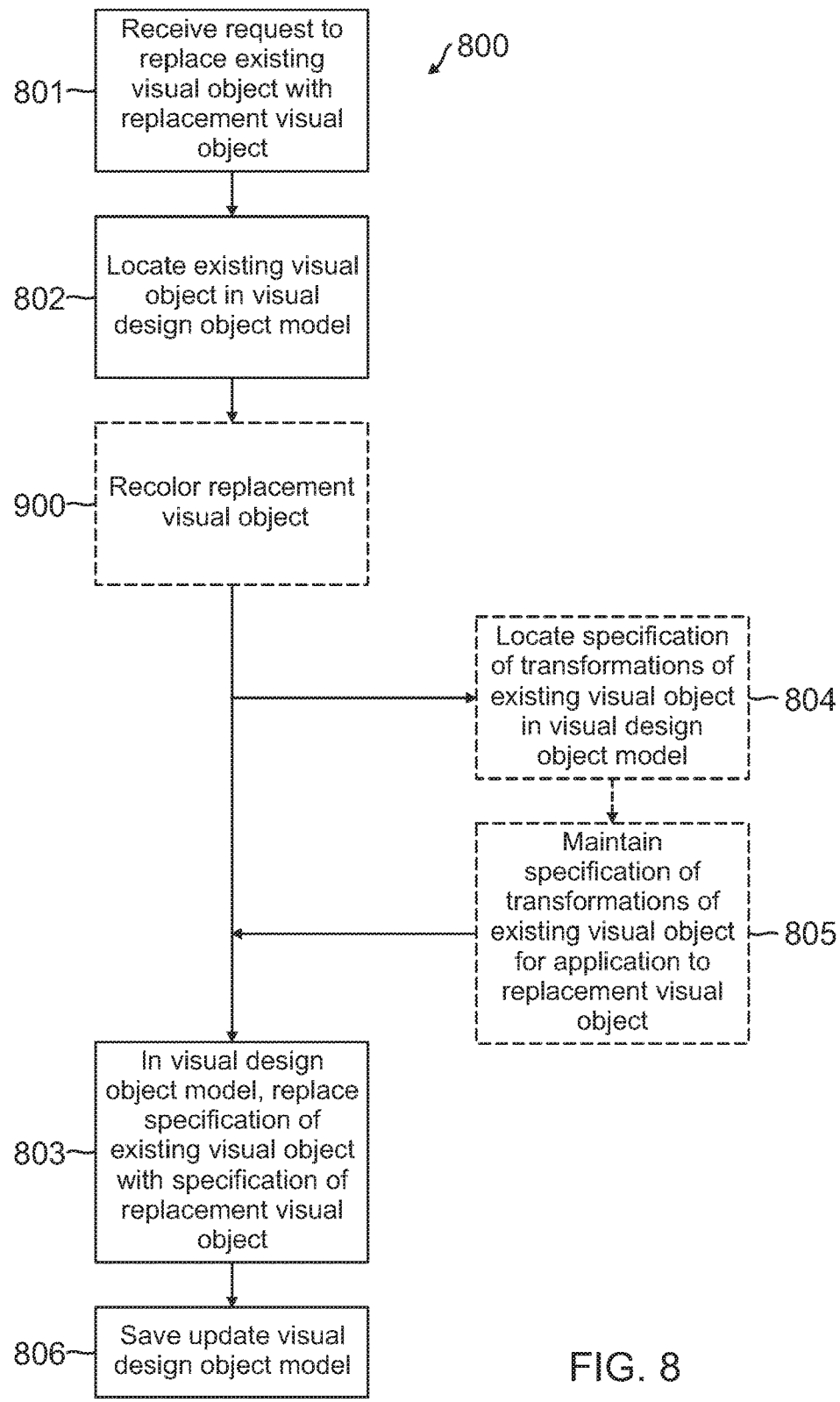
FIG. 8 is a flowchart illustrating an exemplary embodiment of a method executed by an electronic visual design tool for replacing existing visual objects in a plurality of visual design specifications with a different selected visual object.

FIG. 8 details an exemplary embodiment of a method executed by an electronic visual design tool 25/522/532 for replacing existing visual objects in a plurality of visual design specifications with a different selected visual object. In this embodiment, the electronic visual design tool 25/522/532 is a computer program executing on an application server machine 520/530, as shown in FIG. 5. The electronic visual design tool 25/522/532 implements steps of a method 800 to replace existing visual objects in a plurality of different visual design specifications with a different selected visual object. As shown in FIG. 8, the steps include receiving a request to replace an existing visual object present in a visual design specification with a replacement visual object (step 801). In each visual design object, the electronic visual design tool 25/522/532 operates to locate the specification of the existing visual object in the visual design specification (step 802). The electronic visual design tool 25/522/532 further operates to replace the specification of the existing visual object in the visual design specification with the specification of the replacement visual object (step 803). In an embodiment, any transformations applied to the existing visual object, such as translations, scaling, rotations, warping, etc., are first determined and/or located (step 804), and the specification for such transformations is maintained in the visual design specification or applied to the replacement visual object specification (step 805) when replacing the specification of the existing visual object with the specification of the replacement visual object (in step 803). The updated visual design specification is then saved (step 806).

For example, the electronic visual design tool 25/522/532 may be implemented as a server-side visual object replacement program such as discussed in connection with 731 in FIG. 7A. In this example, the visual design is represented as a C# object such as the C# Template object described above. In this example, when the electronic visual design tool 25/522/532 is called to replace the "icon" value with a replacement icon value, the electronic visual design tool 25/522/532 may include a call to the template function for setting the icon value. For example, to replace the icon in the object identified as "Template1", the method identifies location of the existing icon with the call "Template1.Icon.Set (<replacement icon specification>)". The location of the icon specification within the Template1 object is inherently specified in the method call (i.e., as ".Icon"). The value of the replacement icon is the parameter to the method call. The "value" in this case may be a string containing SVG code that specifies how to draw the replacement icon, or may be a reference or pointer to a location that contains the SVG code for the replacement icon.

In an alternative implementation, the electronic visual design tool 25/522/532 is implemented as a client-side visual object replacement script, such as that discussed in connection with 714 in FIG. 7B.

The electronic visual design tool 25/522/532 may be called for each visual design template that is, or is to be, displayed in the presentation gallery 400.

Returning to FIG. 8, the electronic visual design tool 25/522/532 optionally includes a step of recoloring the replacement electronic visual object (that is, setting color specification (s) in the specification of the electronic visual object to one or more specified color(s)) (step 900) prior to insertion of the electronic visual object specification into the electronic visual design specification.

Figure 9:
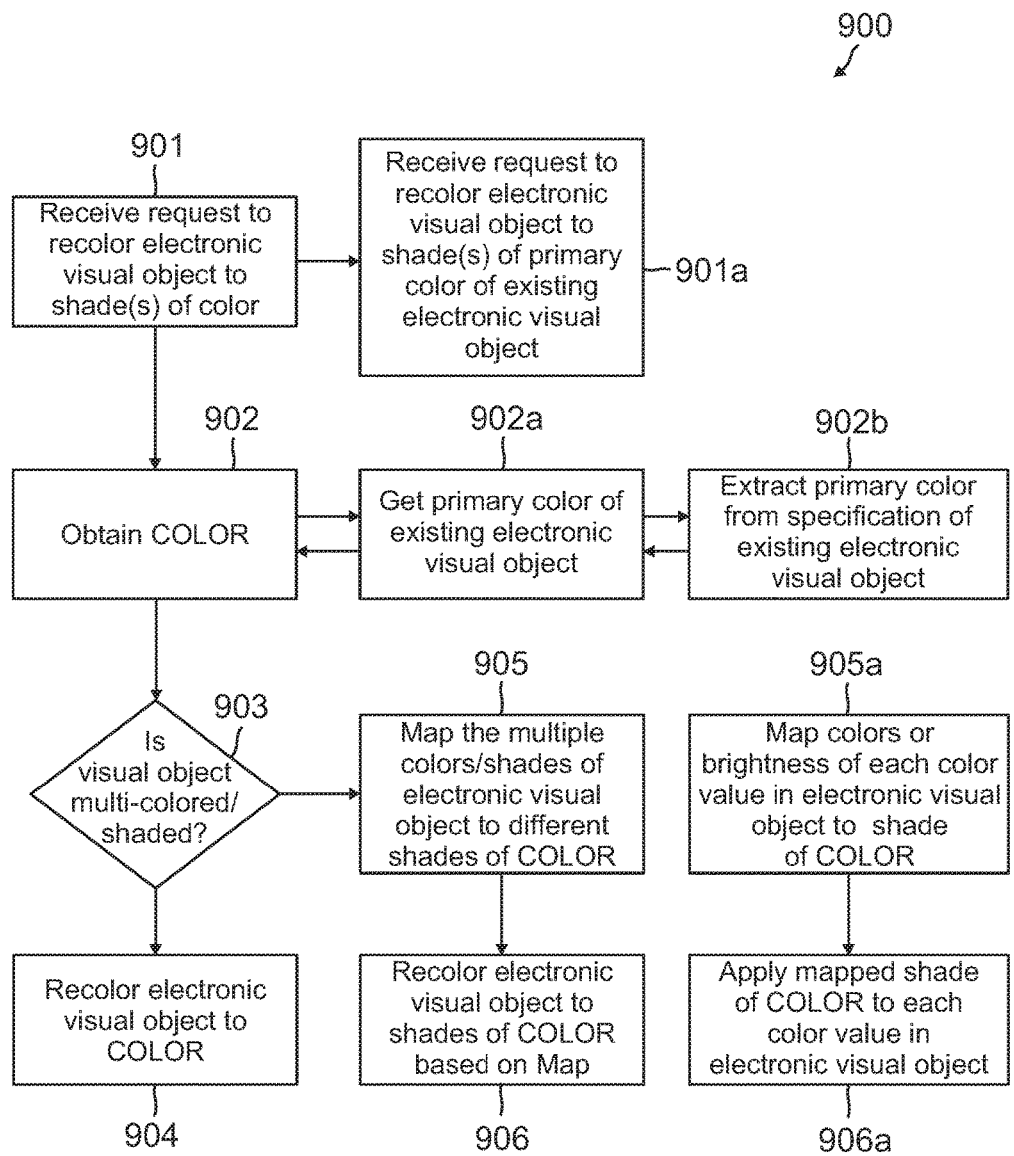
FIG. 9 is a flowchart illustrating an exemplary embodiment of a method executed by an electronic design recoloring apparatus 533 for recoloring the replacement visual object.

FIG. 9 details an exemplary embodiment of steps of a method 900 executed by an electronic design recoloring apparatus 533 for recoloring the replacement visual object. In this embodiment, the electronic design recoloring apparatus 533 is a computer program executing on an application server machine 530, as shown in FIG. 5. The electronic design recoloring apparatus 533 implements steps of a method 900 to recolor an electronic visual object to one or more specified color(s) (or shade(s) thereof). The electronic visual design tool 52/532 may invoke the electronic design recoloring apparatus 533 to recolor a replacement visual object to shade(s) of a color of an existing visual object in a visual design template.

The method 900 begins with the receipt of a request to recolor an electronic visual object (step 901). In an embodiment, the request is a method call of a software function implementing the recolor method 900. The recolor method 900 receives or obtains the color (COLOR) that will be the basis for recoloring the visual object (step 902). In an embodiment, COLOR is directly or indirectly passed to the method as a parameter. In an alternative embodiment, the method determines COLOR from a second object, such as an existing visual object (step 902a). For example, the method may directly or indirectly receive a second visual object or a reference to the second visual object from which COLOR is determined. In an embodiment, the method extracts the color(s) from the specification of such second visual object, and selects a primary color from the extracted color(s) (step 902b).

The apparatus 533 determines whether the visual object to be recolored contains more than one color and/or shade of color (step 903). In an embodiment, the electronic design recoloring apparatus 533 reads the fill color style attributes of the received visual object specification to determine all the instances of the fill color style attribute definition and whether there is more than one defined value across all the determined fill color attribute instances. If the visual object to be recolored contains only one color, then all instances of fill color style attribute will have the same color value. If there is no more than one color specified in the specification of the electronic visual object, then the electronic design recoloring apparatus 533 sets the color of the visual object to the received color value COLOR (step 904). In an embodiment, the method modifies the specification of the visual object to set the fill color style attribute associated with the design elements of the object to the value of COLOR.

If the visual object to be recolored contains more than one color or shade(s) of color(s), then different instances of fill color style attribute will have different color values. If there is more than one color specified in the specification of the electronic visual object, then the electronic design recoloring apparatus 533 maps the multiple color(s) and/or shade(s) of color(s) specified in the visual object specification to different shades of COLOR (step 905), and then modifies the visual object specification to replace the original color value of each design element in the visual object specification to the mapped value to which the original color value maps (as determined from step 905) (step 906). In an embodiment, the mapping step includes mapping the color value of each color in the visual object specification to a shade of COLOR (step 905a), and then modifying the values of the fill color style attributes of the elements in the visual object to their respective mapped shade of COLOR.

Figure 10:
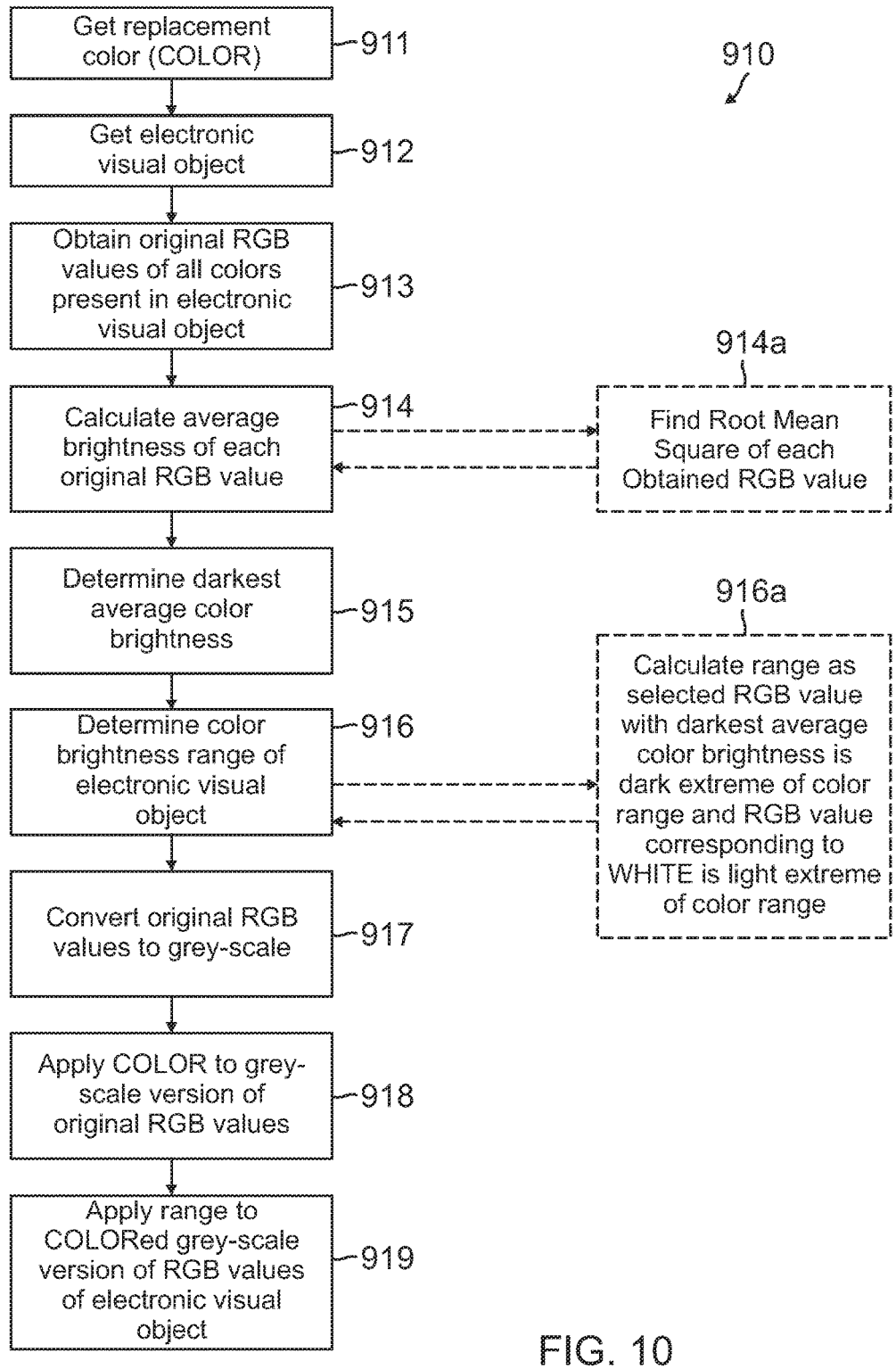
FIG. 10 is a flowchart illustrating an exemplary method executed by the electronic design recoloring apparatus for mapping colors of a colored visual object to shades of a predefined color.

FIG. 10 is a flowchart illustrating an exemplary method 910 executed by the electronic design recoloring apparatus 26/533 for mapping the color(s) and/or shade(s) of a colored visual object to shades of a predefined color (e.g., the value of COLOR). The method 910 begins by obtaining or receiving the value of the predefined color (COLOR) (step 911). The method 910 also obtains or receives (directly or indirectly) the visual object (or a reference/address thereto) (step 912). The method 910 then obtains the red (R), green (G), blue (B) color values for each color present in the visual object (step 913). The method 910 then calculates the average color brightness of each obtained RGB color value (step 914). The average brightness can be calculated via one of several methods. For example, the average could be calculated as the mean value of the individual R, G, and B values of each color—that is, (R+G+B)/3. In an embodiment, the calculated average is a Root Mean Square value of the R, G, and B values for the given color value (step 914a), calculated as:

$$RMS \text{ Average Color Brightness} = \sqrt{R^2 + G^2 + \frac{B^2}{3}}$$

In an alternative embodiment, the calculated average may be calculated similarly to the center of mass (COM), for each of the R, G and B dimensions, for example as:

$$COM \text{ Average Color Brightness} = \sqrt[3]{R^3 + G^3 + \frac{B^3}{3}}$$

Given the average brightness levels for each color in the visual object, the darkest average color brightness is determined by determining the color, or RGB value, in the original visual object corresponding to the darkest average color brightness (step 915). The method 910 maps the darkest color (i.e., the RGB color value associated with the darkest average color brightness) to the RGB value of COLOR (step 916). In an embodiment, the range is calculated as the difference between the darkest average color brightness value and the lightest possible (e.g., WHITE) color brightness value (step 916a). In an alternative embodiment, the range may be calculated as the difference between the darkest average color brightness value and the lightest color brightness value contained in the original visual object. The colors of the original visual object are converted to grey-scale RGB value (step 917), and then the replacement color COLOR is applied to the RGB values of the grey-scale version of the visual object (step 928). Finally, the calculated visual object brightness range (from step 916) is applied to the colored grey-scale version of the RGB values of the electronic visual object (step 919) to generate shaded COLORed version of the original image.

The application of FIGS. 8-10 can be better understood from an example. An example SVG specification for the template 420b (FIG. 4A) is shown in Code Listing 5, as follows:

Code Listing 5: Example Visual Design Specification (as SVG Specification)

```
<svg xmlns="http://www.w3.org/2000/svg" xmlns:xlink="http://www.w3.org/1999/xlink" version="1.1"
     width="800" height="800" viewBox="50 50 512 512" xml:space="preserve">
<desc>Created with Fabric.js 1.7.2</desc>
<defs></defs>
<g id="Background" style="stroke: none; stroke-width: 1; stroke-dasharray: none; stroke-linecap: butt;
   stroke-linejoin: miter; stroke-miterlimit: 10; fill: none; fill-rule: nonzero; opacity: 1;"
   transform="translate(66 66)">
        <circle id="Background" cx="302" cy="301" r="140" style="stroke:
        rgb(124,45,127); stroke-width: 1; stroke-dasharray: none; stroke-linecap:
        round; stroke-linejoin: round; stroke-miterlimit: 10; fill: none; " transform="
        matrix(1 0 0 1 -66 -66)" />
        <circle id="Background" cx="302" cy="301" r="225" style="stroke:
        rgb(124,45,127); stroke-width: 4; stroke-dasharray: 1 12; stroke-linecap:
        round; stroke-linejoin: round; stroke-miterlimit: 10; fill: none; " transform="
        matrix(1 0 0 1 -66 -66)" />
        <circle id="Background" cx="302" cy="302" r="182" style="stroke:
        rgb(206,185,171); stroke-width: 75; stroke-dasharray: none; stroke-linecap:
        butt; stroke-linejoin: miter; stroke-miterlimit: 10; fill: none; " transform="
        matrix(1 0 0 1 -66 -66) " />
    </g>
<g id="Icon"><g><path d="M357.7,303.9c-1-1.1-2.3-1.7-3.7-1.9c0.3-3.1,0.6-7.4,0.3-12.2c-0.4-9.2-2.6-
22.3-10.9-32.4  c-4.6-5.6-10.4-9.7-17.6-12.3c0.1-0.4,0.2-0.8,0.2-1.3c0-2.8-2.3-5.2-5.2-
5.2H287c-2.8,0-5.2,2.3-5.2,5.2  c0,0.4,0.1,0.9,0.2,1.3c-7.1,2.6-13,6.7-17.6,12.3c-8.3,10.1-
10.5,23.2-10.9,32.4c-0.2,4.8,0,9.1,0.3,12.2   c-1.4,0.2-2.7,0.8-3.7,1.9c-1.1,1.2-1.7,2.9-
1.5,4.6|0.8,8.2c0.3,3.5,3.5,6.3,7,6.3h0.7|10.7,63.6|0,0c0.6,3.4,4.3,6.1,8,6.1   H331c3.8,0,7.5-
2.7,8.1-6.1|10.4-63.7h1.9c3.5,0,6.6-2.8,7-6.3|0.8-8.2C359.4,306.8,358.8,305.2,357.7,303.9z
M273.7,295.2   c0-0.1,0-0.2,0-0.2c0,0,0-0.1,0-0.1c0-6.1,5-11.1,11.1-
11.1c2,0,3.9,0.5,5.7,1.6|1.3,0.8|0.6-1.3c1-2.1,3-3.4,5.3-3.4   c2.4,0,4.5,1.4,5.4,3.7|1.1,2.6|1.3-
2.4c1.3-2.3,3.7-3.8,6.3-3.8c2.4,0,4.6,1.2,5.9,3.2|1.1,1.6|1.1-1.5c1.4-2,3.7-3.2,6.2-3.2
c4.1,0,7.5,3.2,7.6,7.4   |0,1.4|1.4-0.1
c0.1,0,0.2,0,0.4,0c0.1,0,0.2,0,0.3,0c4.4,0,8,3.6,8,7.9c0,0,0,0.1,0,0.2v1.1|1.1,0.2
c1.6,0.3,3,1.3,3.7,2.7H262c0.3-3.5,3.2-6.3,6.8-6.3c1,0,2,0.2,2.3,0.7|1.9,0.9L273.7,295.2z
M287,241.3h33.8   c1.4,0,2.5,1.1,2.5,2.5c0,1.4-1.1,2.5-2.5,2.5H287c-1.4,0-2.5-1.1-2.5-
2.5C284.5,242.4,285.6,241.3,287,241.3z M256.1,289.8   c0.4-8.8,2.5-21.3,10.3-30.8c4.3-
5.3,10-9.2,16.9-11.6c0.9,0.9,2.2,1.5,3.7,1.5h33.8c1.4,0,2.7-0.6,3.7-1.5
c6.9,2.5,12.5,6.3,16.9,11.6c7.8,9.5,9.9,22,10.3,30.8c0.2,4.8,0,9.3,-0.3,12.1c0-0.8-2.3-2.7-4.1-5-4.9c-
0.5-5.3-4.8-9.5-10.2-9.7   c-0.8-4.9-5-8.6-10.1-8.6c-2.7,0-5.3,1.1-7.2,3c-1.8-1.9-4.4-3-7.1-3c-
2.8,0-5.5,1.2-7.3,3.3c-1.6-2.1-4.1-3.3-6.8-3.3   c-2.8,0-5.5,1.4-7,3.8c-1.8-0.9-3.8-1.3-5.8-1.3c-
7,0-12.9,5.3-13.6,12.2c-0.8-0.2-1.5-0.3-2.3-0.3c-5,0-9.2,4-9.5,8.9h-2.9
C256.2,298.9,255.9,294.6,256.1,289.8z M275.9,390.2c-2.6,0-5.1-1.8-5.5-3.9|-10.6-63.2h76.6|-
11.1,59c-0.1,0.3-2,8.1-12.2,8.1   L275.9,390.2L275.9,390.2z M336.6,386.3c-0.4,2.1-3,4-5.5,4h-
8.5c1.1-0.8,2-1.6,2.7-2.4c2.1-2.5,2.7-5.2,2.7-5.2|11.2-59.5h7.8   L336.6,386.3z M356.6,308.3|-
0.8,8.2c-0.2,2.1-2.2,3.9-4.3,3.9h-95c-2.1,0-4.1-1.8-4.3-3.9|-0.8-8.3c-0.1-1,0.2-1.9,0.8-2.6  c0.6-
0.7,1.5-1.1,2.5-1.1h98.6c1,0,1.9,0.4,2.5,1.1C356.4,306.4,356.7,307.3,356.6,308.3z"
style="fill:#7C2D7F;"/><path d="M237.2,269c-3.4,0-6.2,2.8-6.2,6.2s2.8,6.2,6.2,6.2c3.4,0,6.2-
2.8,6.2-6.2   C243.4,271.7,240.7,269,237.2,269z M237.2,278.7c-2,0-3.6-1.6-3.6-3.6c0-2,1.6-
3.6,3.6-3.6c2,0,3.6,1.6,3.6,3.6   C240.8,277.1,239.2,278.7,237.2,278.7z"
style="fill:#7C2D7F;"/><path d="M266.8,238.9c4.1,0,7.4-3.3,7.4-7.4c0-4.1-3.3-7.4-7.4-7.4c-
4.1,0-7.4,3.3-7.4,7.4   C259.3,235.6,262.7,238.9,266.8,238.9z
M266.8,226.7c2.6,0,4.8,2.1,4.8,4.8c0,2.6-2.1,4.8-4.8,4.8c-2.6,0-4.8-2.1-4.8-4.8
C262,228.8,264.1,226.7,266.8,226.7z" style="fill:#7C2D7F;"/><path d="M285.6,271.6c3.1,0,5.7-
2.6,5.7-5.7s-2.6-5.7-5.7-5.7c-3.1,0-5.7,2.6-5.7,5.7S282.4,271.6,285.6,271.6z
M285.6,262.8c1.7,0,3.1,1.4,3.1,3.1c0,1.7-1.4,3.1-3.1,3.1c-1.7,0-3.1-1.4-3.1-
3.1S283.9,262.8,285.6,262.8z" style="fill:#7C2D7F;"/><path d="M307.5,267.2c2.9,0,5.2-2.3,5.2-
5.2c0-2.9-2.3-5.2-5.2-5.2c-2.9,0-5.2,2.3-5.2,5.2   C302.3,264.9,304.6,267.2,307.5,267.2z
M307.5,259.4c1.4,0,2.6,1.2,2.6,2.6c0,1.4-1.2,2.6-2.6,2.6c-1.4,0-2.6-1.2-2.6-2.6
C304.9,260.5,306.1,259.4,307.5,259.4z" style="fill:#7C2D7F;"/><path
d="M349.2,245.1c3.5,0,6.4-2.9,6.4-6.4c0-3.5-2.9-6.4-6.4-6.4s-6.4,2.9-6.4,6.4
C342.8,242.2,345.7,245.1,349.2,245.1z M349.2,235c2.1,0,3.7,1.7,3.7,3.7c0,2.1-1.7,3.7-3.7,3.7s-
3.7-1.7-3.7-3.7   C345.4,236.7,347.1,235,349.2,235z" style="fill:#7C2D7F;"/><path
d="M310.8,222.8c4.9,0,8.9-4,8.9-8.9c0-4.9-4-8.9-8.9-8.9c-4.9,0-8.9,4-8.9,8.9
C301.9,218.8,305.9,222.8,310.8,222.8z M310.8,207.7c3.4,0,6.2,2.8,6.2,6.3c0,3.4-2.8,6.2-
6.2,6.2c-3.4,0-6.3-2.8-6.3-6.2   C304.5,210.5,307.3,207.7,310.8,207.7z"
style="fill:#7C2D7F;"/><path d="M333.5,274.4c2.7,0,4.9-2.2,4.9-4.9c0-2.7-2.2-4.9-4.9-4.9c-
2.7,0-4.9,2.2-4.9,4.9   C328.6,272.2,330.8,274.4,333.5,274.4z
M333.5,267.2c1.2,0,2.3,1,2.3,2.3c0,1.3-1,2.3-2.3,2.3c-1.3,0-2.3-1-2.3-2.3
C331.3,268.2,332.3,267.2,333.5,267.2z" style="fill:#7C2D7F;"/></g><rect x="207.3" y="204.7"
width="190" height="190" style="fill:none;"/>
</svg></g>
<g id="MainText" transform="translate(300 210)">
<g transform="translate(-180 94) rotate(-95)">
        <text font-family="'Montserrat'" font-size="53">
                <tspan x="-16" y="16" fill="#5467FD">S</tspan>
        </text>
</g>
        <g transform="translate(-178 56) rotate(-84)">
                <text font-family="'Montserrat'" font-size="53">
                        <tspan x="-18" y="17" fill="#5467FD">a</tspan>
```

```
            </text>
        </g>
        <g transform="translate(-166 17) rotate(-72)">
            <text font-family="'Montserrat'" font-size="53">
                <tspan x="-19" y="17" fill="#5467FD">m</tspan>
            </text>
        </g>
        <g transform="translate(-146 -19) rotate(-60)">
            <text font-family="'Montserrat'" font-size="53">
                <tspan x="-19" y="17" fill="#5467FD">p</tspan>
            </text>
        </g>
        <g transform="translate(-118 -49) rotate(-45)">
            <text font-family="'Montserrat'" font-size="53">
                <tspan x="-19" y="17" fill="#5467FD">l</tspan>
            </text>
        </g>
        <g transform="translate(-88 -70) rotate(-33)">
            <text font-family="'Montserrat'" font-size="53">
                <tspan x="-14" y="17" fill="#5467FD">e</tspan>
            </text>
        </g>
        <g transform="translate(-56 -84) rotate(-23)">
            <text font-family="'Montserrat'" font-size="53">
                <tspan x="-17" y="17" fill="#5467FD"> </tspan>
            </text>
        </g>
        .
        .
        .
</g>
<g id="SubText" transform="translate(303 350)">
    .
    .
    .
</g>
</svg>
```

From the example template specification shown in Code Listing 5, it can be seen that the fill color used for all elements in the Icon element is set to the hex value #7C2D7F, or RGB(124,45,127). Since there is only one fill value, then the primary color for the Icon element is understood to be that fill value. If there is more than one fill value, the electronic visual design tool 25 selects one of the fill values as the primary color, COLOR.

When a new visual object is selected to replace the current Icon value, the Icon specification in the template image 420*b* is updated to replace the original Icon specification with an SVG specification of the replacement icon. For example, when the "blocks" icon is selected (as in FIG. 4D), the original Icon specification in template image 420*b* is updated to replace the original Icon specification (the specification defined within the group tag identified by id="Icon") with an SVG specification of the replacement "blocks" icon.

Code Listing 6, below, is an example of an SVG specification for the "blocks" visual object. Code Listing 6: "Blocks" visual object SVG specification

```
<g id="Icon" style="stroke: none; stroke-width: 1; stroke-dasharray:
    none; stroke-linecap: butt; stroke-linejoin: miter; stroke-miterlimit:
    10; fill: none; fill-rule: nonzero; opacity:
    1;" transform="translate(250 250)">
<svg width="400" height="110">
<rect id="Rectangle1" x="5" y="5" width="30"
height="30" style="fill:rgb(214,191,59)" />
<rect id="Rectangle2" x="5" y="40" width="90"
height="30" style="fill:rgb(131,130,23)" />
<rect id="Rectangle3" x="100" y="40" width="30"
```

-continued

```
height="30" style="fill:rgb(57,28,32)" />
</svg></g>
```

Prior to replacement of the Icon specification in the visual design template specification of Code Listing 5, the Icon can be recolored to ensure it matches the color scheme of the visual design template. In an embodiment, the electronic visual design tool 25 uses an electronic design recoloring apparatus which automatically recolors a received electronic design according to one or more colors and/or shades of colors. In an embodiment, the electronic design recoloring apparatus is a computer program 533, executing on a computer-implemented device 530, which receives from the electronic visual design tool 25/532 a visual design specification or reference thereto, along with one or more colors.

In one embodiment, the electronic visual design tool 25/532 determines one or more colors from the visual design objects (which may or may not include the colors of the original visual object being replaced) of the electronic visual design in which the recolored replacement visual object will be inserted. The electronic visual design tool 25/532 selects one or more of the determined color(s) and passes the selected color(s) COLOR, along with the specification, or reference thereto, of the electronic visual object being recolored, to the electronic design recoloring apparatus 533. For example, the visual design specification may define one or more fill color style attributes for various design objects defined therein, and the electronic visual design tool 25/532 may retrieve the fill colors for the various design objects and select one or more of the specified colors as the colors for use by the electronic design recoloring apparatus 533 when recoloring the replacement visual object.

In an alternative embodiment, the electronic visual design tool 25/532 determines one or more colors from the original electronic visual object being replaced, selects one or more of the determined color(s) and passes the selected color(s) COLOR, along with the specification of (or reference to) the electronic visual object being recolored, to the electronic design recoloring apparatus 533. For example, the visual object being replaced may define one or more fill color style attributes for various design elements defined therein, and the electronic visual design tool 25/532 may retrieve the fill colors for the various design elements and select one or more of the specified colors as the colors for use by the electronic design recoloring apparatus 533 when recoloring the replacement visual object.

The color COLOR received by the electronic design recoloring apparatus 533 may be specified in an RGB format, or alternatively may be in another format from which the electronic design recoloring apparatus 533 can extract the RGB values of the respective received colors. Returning to the example visual object specification in Code Listing 6, the replacement icon "blocks" is characterized by three different colors, which include the "fill color" of each defined rectangle element: the rectangle element identified as id="Rectangle1" is defined with fill color RGB(215, 191, 59) (i.e., style="fill:rgb(214,191,59)"); the rectangle element identified as id="Rectangle2" is defined with fill color RGB(131,130,23) (i.e., style="fill:rgb(131,130,23)"); and the rectangle element identified as id="Rectangle3" is defined with fill color RGB(57,28,32) (i.e., style="fill:rgb(57,28,32)"). To recolor the "blocks" icon to match the color scheme of the template 420a, the electronic visual design recolor program 533 executes steps per method 910 from FIG. 10. For example, in the present example, per step 916 in FIG. 10, the average brightness for each color in the electronic visual object is calculated using the root mean square (RMS), defined previously, of the individual R, G, and B values of each color contained in the electronic visual object color. In this example, the average color brightness of each rectangle is calculated as (and then rounded to nearest integer):

Rectangle1 Average Color Brightness: rgb(214,191, 59)→[($214^2$+$191^2$+$59^2$)/3]$^{1/2}$=169

Rectangle2 Average Color Brightness: rgb(31,95, 123)→[($131^2$+$130^2$+$23^2$)/3]$^{1/2}$=107

Rectangle3 Average Color Brightness: rgb(157,28, 32)→[($57^2$+$28^2$+$32^2$)/3]$^{1/2}$=41

In most computer system that use RGB, the color black is defined with the value RGB(0, 0, 0) (or in hexadecimal notation, #000000) and the color white is defined by the value RGB(255, 255, 255) (or hex #(FFFFFF)). Accordingly, based on the average color brightness values of the rectangles Rectangle1, Rectangle2, Rectangle3, 41 (verus 107 and 169) is considered the darkest color. Thus, Rectangle3 is characterized by the darkest average color brightness.

Next, the color brightness range is calculated, per step 917 in FIG. 10. The brightness range therefore ranges from 255 (lightest, or white) to 41 (darkest), so the range is calculated as (darkest possible value−darkest average color brightness value), or 255−41=214.

Next, per step 917 of FIG. 10, the original image is converted to grey-scale by setting each of the R, G, and B values for a given color to its corresponding Average Color Brightness. Thus, the grey-scale values for the original colors are:

Rectangle1: rgb(169,169,169)

Rectangle2 rgb(107,107,107)

Rectangle3 rgb(41,41,41)

The Average Color Brightness values for each original RGB value can be used to determine, for each color, a depth of color (DOC) proportionality constant (which indicates where the brightness of a given original RGB color lies within the within the full grey-scale brightness range (range of 255 (white) to 0 (black)). DOC proportionality constants for each of the original RGB values are calculated, for example given the following equation:

$$C = \frac{\text{Lightest Brightness} - \text{original } RGB \text{ Average Brightness}}{\text{Full Brightness Range}}$$
$$= \frac{255 - \text{Average Color Brightness Value of } RGB \text{ color}}{255}$$

Thus, DOC proportionality constant values for the original colors are:

Rectangle1 $C_1$:(255−169)/255=0.33

Rectangle2 $C_2$:(255−107)/255=0.58

Rectangle3 $C_3$:(255−41)/255=0.84, and the grey-scale values for the original colors can be converted to the new color COLOR as:

$R_{New}$=Lightest Brightness−($C$*(Lightest Brightness−$R_{Replacement}$))

$G_{New}$=Lightest Brightness−($C$*(Lightest Brightness−$G_{Replacement}$))

$B_{New}$=Lightest Brightness−($C$*(Lightest Brightness−$B_{Replacement}$))

Thus, per step 918 in FIG. 10, the new color COLOR is applied to the grey-scale version of the original values as follows:

Rectangle1:

$RGB_{New\_1} = rgb((255 - (C_1^*(255 - 124))),$ $(255 - (C_1^*(255 - 45))), (255 - (C_1^*(255 - 127)))) = rgb((255 - .33^*(255 - 124)),$ $(255 - .33^*(255 - 45))), (255 - .33^*$ $(255 - 127)))) = rgb(211, 184, 212)$ Rectangle2:

$RGB_{New\_2} = rgb((255 - (C_2^*(255 - 124))),$ $(255 - (C_2^*(255 - 45))), (255 - (C_2^*(255 - 127)))) =$ $rgb((255 - .58^*(255 - 124)), (255 - .58^*(255 - 45))),$ $(255 - .58^*(255 - 127)))) = rgb(179, 133, 181)$ Rectangle3 grey-scale value:

$RGB_{New\_3} = rgb((255 - (C_1^*(255 - 124))),$

-continued $$(255-(C_1^*(255-45))), (255-(C_1^*(255-127)))) =$$

$$rgb((255-.84^*(255-124))), (255-.84^*(255-45))),$$

$$(255-.84^*(255-127)))) = rgb(145, 79, 148)$$

Next, per step 919 of FIG. 10, the range (calculated in step 916) is applied to the colored grey-scale version of the original image:

$$RGB_{Replacement} = \frac{(RGB_{New} - \text{Darkest Average Brightness}) * \text{Full Range}}{\text{Visual Object Brightness Range}}$$

Thus, per step 919 in FIG. 10, the replacement RGB values for the visual object are finally calculated as follows:

Rectangle1:

$$RGB_{Replacement\_1} =$$

$$rgb(((RGB_{New\_1\_R} - 41)^*255/214), ((RGB_{New\_1\_G} - 41)^*255/214),$$

$$((RGB_{New\_1\_B} - 41)^*255/214)) = rgb(((211-41)^*255/124),$$

$$((184-41)^*(255/214), ((212-41)^*255/214)) = rgb(202, 171, 204)$$

Rectangle2:

$$RGB_{Replacement\_2} =$$

$$rgb(((RGB_{New\_2\_R} - 41)^*255/214), ((RGB_{New\_2\_G} - 41)^*$$

$$255/214), ((RGB_{New\_2\_B} - 41)^*255/214)) =$$

$$rgb(((179-41)^*255/124), ((133-41)^*255/214),$$

$$((181-41)^*255/214)) = rgb(165, 110, 167)$$

Rectangle3 grey-scale value:

$$RGB_{Replacement\_3} =$$

$$rgb(((RGB_{New\_3\_R} - 41)^*255/214), ((RGB_{New\_3\_G} - 41)^*$$

$$255/214), ((RGB_{New\_3\_B} - 41)^*255/214)) =$$

$$rgb(((145-41)^*255/214), ((79-41)^*255/214),$$

$$((148-41)^*255/214)) = rgb(124, 45, 127)$$

With the new color values mapped, the specification of the replacement visual object is updated and can then be inserted into the visual design. The example template specification is updated, as shown in Code Listing 7, as follows (and is shown at 450*a* in FIG. 4C):

Code Listing 7: Example Visual Design Specification (as SVG Specification)

```
<svg xmlns="http://www.w3.org/2000/svg" xmlns:xlink="http://www.w3.org/1999/xlink" version="1.1"
    width="800" height="800" viewBox="50 50 512 512" xml:space="preserve">
<desc>Created with Fabric.js 1.7.2</desc>
<defs></defs>
<g id="Background" style="stroke: none; stroke-width: 1; stroke-dasharray: none; stroke-linecap: butt;
    stroke-linejoin: miter; stroke-miterlimit: 10; fill: none; fill-rule: nonzero; opacity: 1;"
    transform="translate(66 66)">
    <circle id="Background" cx="302" cy="301" r="140" style="stroke:
    rgb(124,45,127); stroke-width: 1; stroke-dasharray: none; stroke-linecap:
    round; stroke-linejoin: round; stroke-miterlimit: 10; fill: none; "transform="
    matrix(1 0 0 1 -66 -66)" />
    <circle id="Background" cx="302" cy="301" r="225" style="stroke:
    rgb(124,45,127); stroke-width: 4; stroke-dasharray: 1 12; stroke-linecap:
    round; stroke-linejoin: round; stroke-miterlimit: 10; fill: none; "transform="
    matrix(1 0 0 1 -66 -66)" />
    <circle id="Background" cx="302" cy="302" r="182" style="stroke:
    rgb(206,185,171); stroke-width: 75; stroke-dasharray: none; stroke-linecap:
    butt; stroke-linejoin: miter; stroke-miterlimit: 10; fill: none; "transform="
    matrix(1 0 0 1 -66 -66) " />
</g>
<g id="Icon"style="stroke: none; stroke-width: 1; stroke-dasharray: none; stroke-linecap: butt; stroke-
    linejoin: miter; stroke-miterlimit: 10; fill: none; fill-rule: nonzero; opacity: 1;"
    transform="translate(250 250)">
<svg width="400" height="110">
<rect id="Rectangle1" x="5" y="5" width="30" height="30" style="fill:rgb(202, 171, 204)" />
<rect id="Rectangle2" x="5" y="40" width="90" height="30" style="fill:rgb(165, 110, 167)" />
<rect id="Rectangle3" x="100" y="40" width="30" height="30" style="fill:rgb(124, 45, 127)" />
</svg></g>
<g id="MainText" transform="translate(300 210)">
    .
    .
    .
</g>
<g id="SubText" transform="translate(303 350)">
    .
    .
    .
</g>
```

An alternative implementation for generating proportional shading of the primary color is to determine a brightness proportionality constant, per the following equation:

$$P_1 = \frac{\text{Avg Brightness Value in Range}}{\text{Brightness Range}} = \frac{(255-169)}{(255-41)} = \frac{86}{214} = 0.40$$

The brightness proportionality constant of Rectangle 2 is calculated as $$P_2 = \frac{\text{Avg Brightness Value in Range}}{\text{Brightness Range}} = \frac{(255-107)}{(255-41)} = \frac{148}{214} = 0.69$$

The brightness proportionality constant of Rectangle 3 is calculated as $$P_3 = \frac{\text{Avg Brightness Value in Range}}{\text{Visual Object Brightness Range}} = \frac{(255-51)}{(255-41)} = \frac{214}{214} = 1$$

The brightness proportionality constant can be applied as a fill-opacity attribute, as shown in Code Listing 8, as follows:

Code Listing 8: Example Visual Design Specification (as SVG Specification)

```
<g id="Icon" style="stroke: none; stroke-
    width: 1; stroke-dasharray: none; stroke-linecap: butt; stroke-
    linejoin: miter; stroke-miterlimit: 10; fill: none; fill-rule: nonzero;
    opacity: 1;" transform="translate(250 250)">
<svg width="400" height="110">
<rect x="5" y="5" width="30" height="30"
style="fill:rgb(124, 45, 127);fill-opacity:.4" />
<rect x="5" y="40" width="90" height="30"
style="fill:rgb(124, 45, 127);fill-opacity:.69" />
<rect x="100" y="40" width="30" height="30"
style="fill:rgb(124, 45, 127);fill-opacity:1 " />
</svg></g>
```

Thus, Rectangle 1 has a fill-opacity corresponding to C1 (0.52), Rectangle 2 has a fill-opacity value corresponding to C2 (1), and Rectangle 3 has a fill-opacity value corresponding to C3 (0.97).

What is claimed is:

1. A computerized method for updating a plurality of visual design specifications, the method executed by at least one computer processing unit, the method comprising:
   storing, in computer memory, a plurality of visual design specifications, each visual design specification having a respective vector graphic specification that is (i) associated with a respective visual object, and (ii) identifiable by way of a key attribute identifier having a corresponding attribute value, each respective visual design specification specified in a format that can be rendered by a rendering application to generate a corresponding device-ready visual design specification;
   receiving, by a processor, an identifier of a replacement visual object having a replacement vector graphic specification;
   retrieving, by the processor, the replacement vector graphic specification associated with the replacement visual object;
   selecting a replacement color, from at least one color used in at least one of the plurality of vector graphic specifications, for the replacement visual object;
   recoloring the replacement visual object, including:
      obtaining original red, green, blue (RGB) values of colors present in the associated vector graphic specification of the replacement visual object,
      calculating an average brightness of each of the original RGB values,
      determining, from the calculated average brightness of each of the original RBG values, a darkest average brightness,
      determining a brightness range associated with the replacement visual object, and
      converting each RGB value of the original RGB values to a shade of the replacement color based on a full possible brightness range; and
   replacing, with the replacement vector graphic specification associated with the replacement visual object, the corresponding attribute value of the key attribute identifier of each visual design specification, to generate, and store in the computer memory, corresponding updated versions of said plurality of visual design specifications.

2. The method of claim 1, further comprising:
   sending, by the processor, said updated versions of said plurality of visual design specifications to said rendering application to generate corresponding device-ready visual design specifications in a format processable by an output driver of an electronic display.

3. The method of claim 2, comprising;
   sending, by the processor, said corresponding device-ready visual design specifications to the output driver of the electronic display to simultaneously display images of updated visual designs corresponding to the updated versions of said plurality of visual design specifications.

4. The method of claim 1, wherein the plurality of vector graphic specifications are implemented in a scalable vector graphic format.

5. The method of claim 1, wherein replacing the corresponding attribute value comprises:
   in each visual design specification, preserving, in the updated version of said respective visual design specification, transformations specified in the visual design specification for the visual object identified by the key attribute identifier.

6. The method of claim 1, wherein recoloring the replacement visual object is performed prior to replacing the corresponding attribute value of the key attribute identifier of each visual design specification.

7. A method for presenting a plurality of visual designs, the method executed by at least one computer processing unit, the method comprising:
   simultaneously displaying, on an electronic display, a plurality of images of different visual designs, each image of the plurality of images having associated therewith a visual design specification;
   receiving an indication identifying a visual object;
   retrieving the visual design specification of each of the plurality of images;
   retrieving a replacement vector graphic specification associated with the indication identifying the visual object;
   determining a replacement color to be used for recoloring the visual object;
   recoloring the visual object, including:

obtaining original red, green, blue (RGB) values of colors present in the replacement vector graphic specification, calculating an average brightness of each of the original RGB values, determining, from the calculated average brightness of each of the original RBG values, a darkest average brightness, determining a brightness range associated with the visual object, and converting each RGB value of the original RGB values to a shade of the replacement color based on a full possible brightness range;

incorporating at least a portion of the replacement vector graphic specification into the respective visual design specification of each of the plurality of images to generate corresponding modified visual design specifications that describe modified versions of the different visual designs displayed as the plurality of images;

from the corresponding modified visual design specifications, generating corresponding images of modified visual designs; and updating the electronic display to display the corresponding images of the modified visual designs.

* * * * *